Oct. 9, 1928.

F. G. FEELEY 1,687,289

PAPER BOX MAKING MACHINE

Filed June 30, 1925    12 Sheets-Sheet 1

INVENTOR.

BY

ATTORNEY.

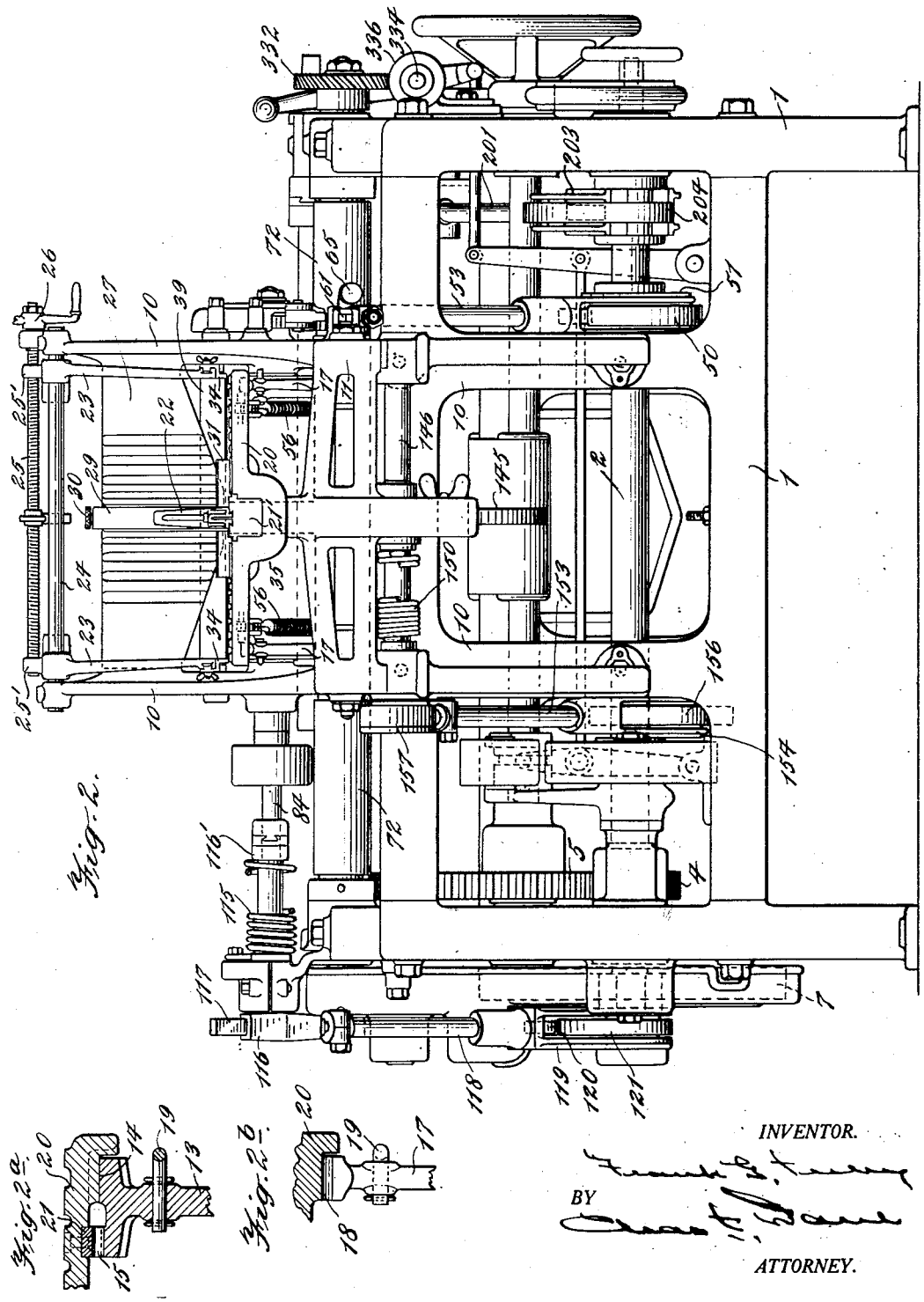

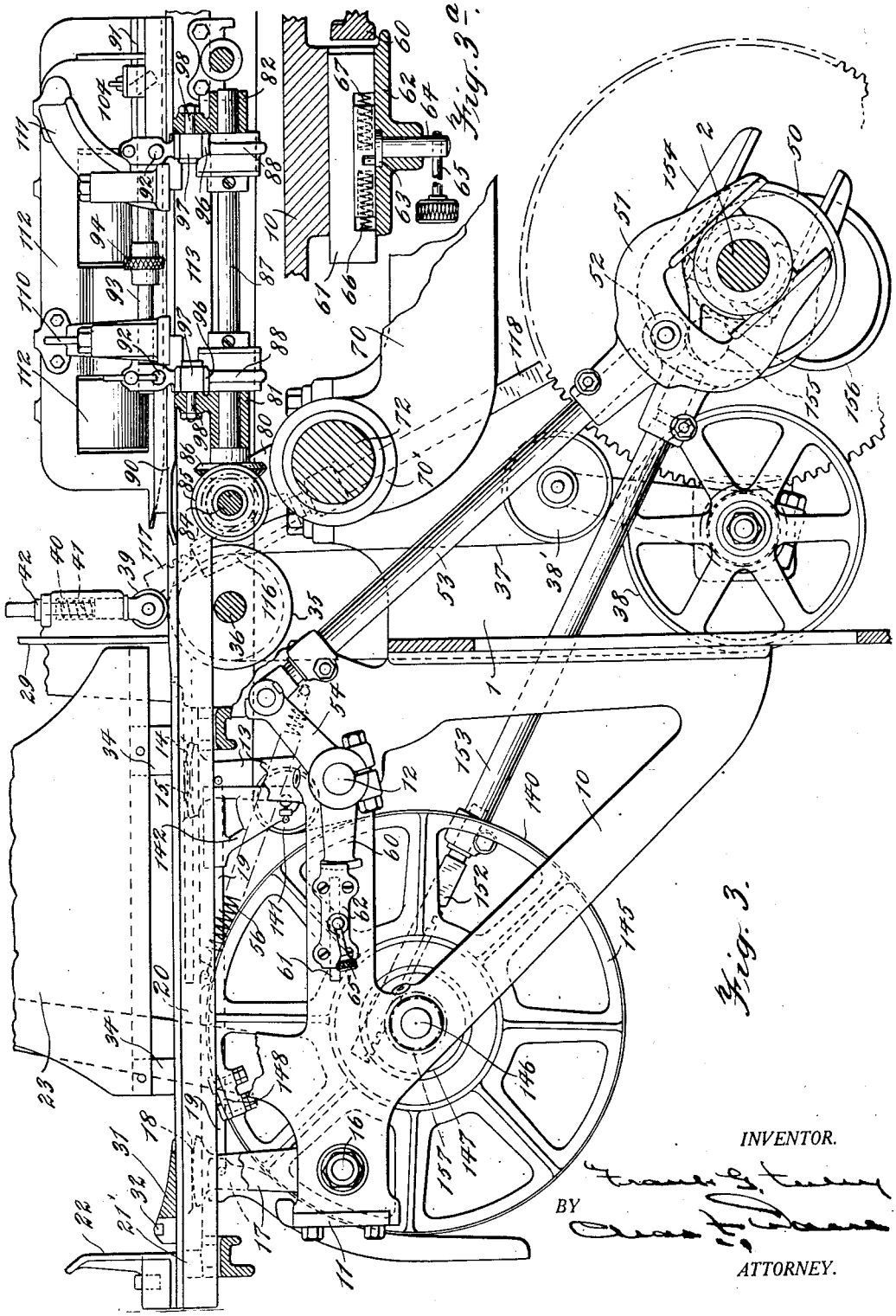

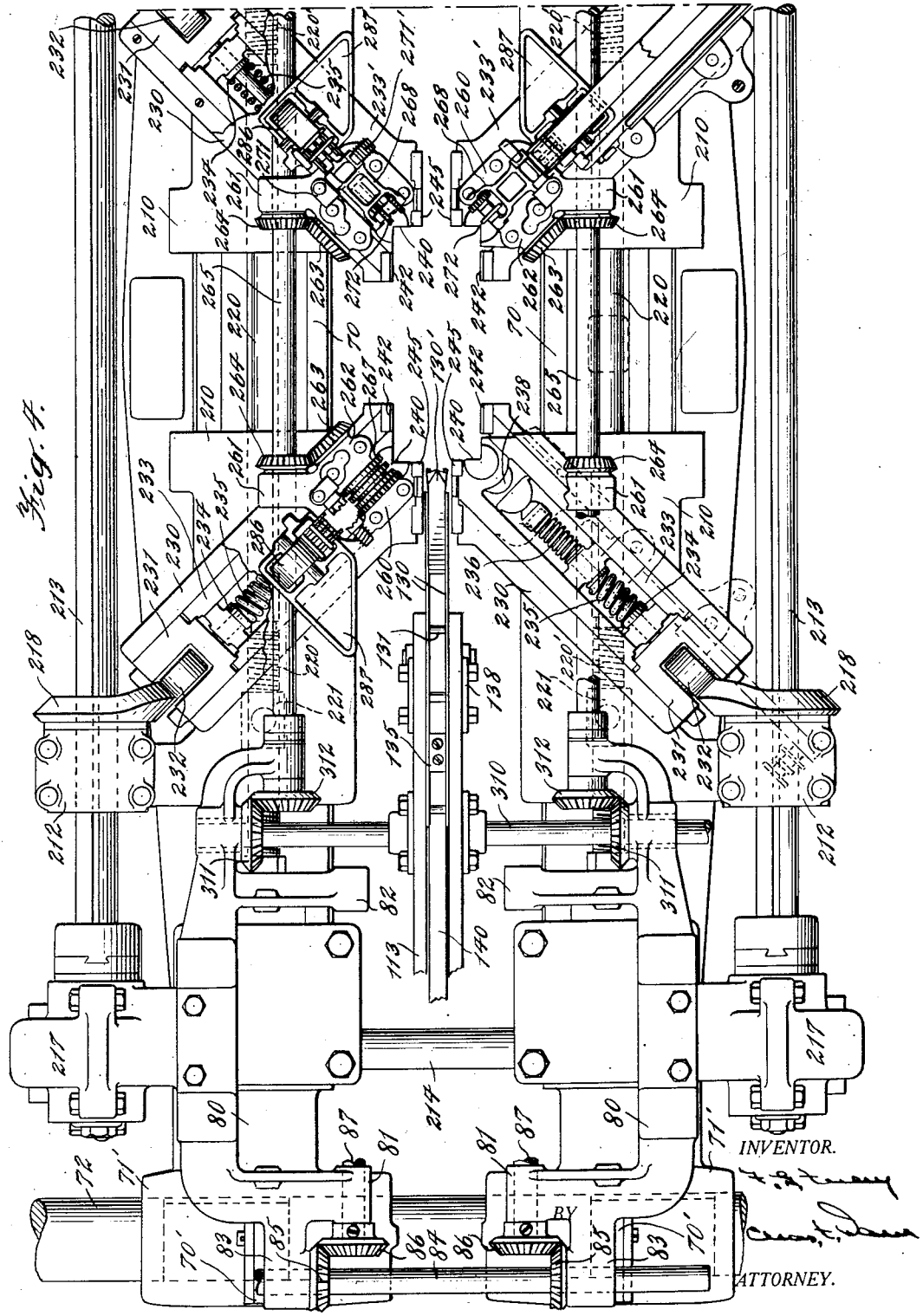

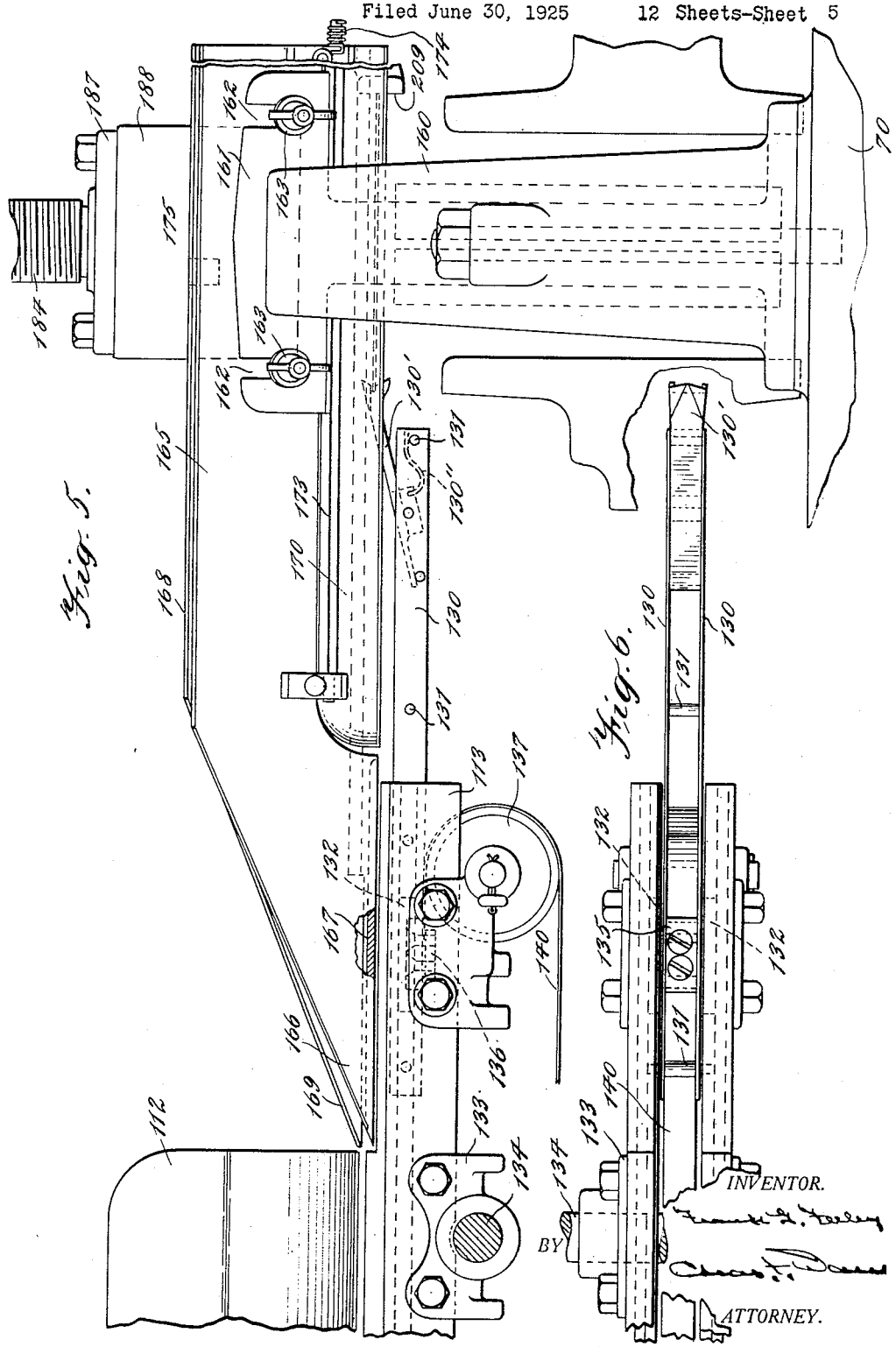

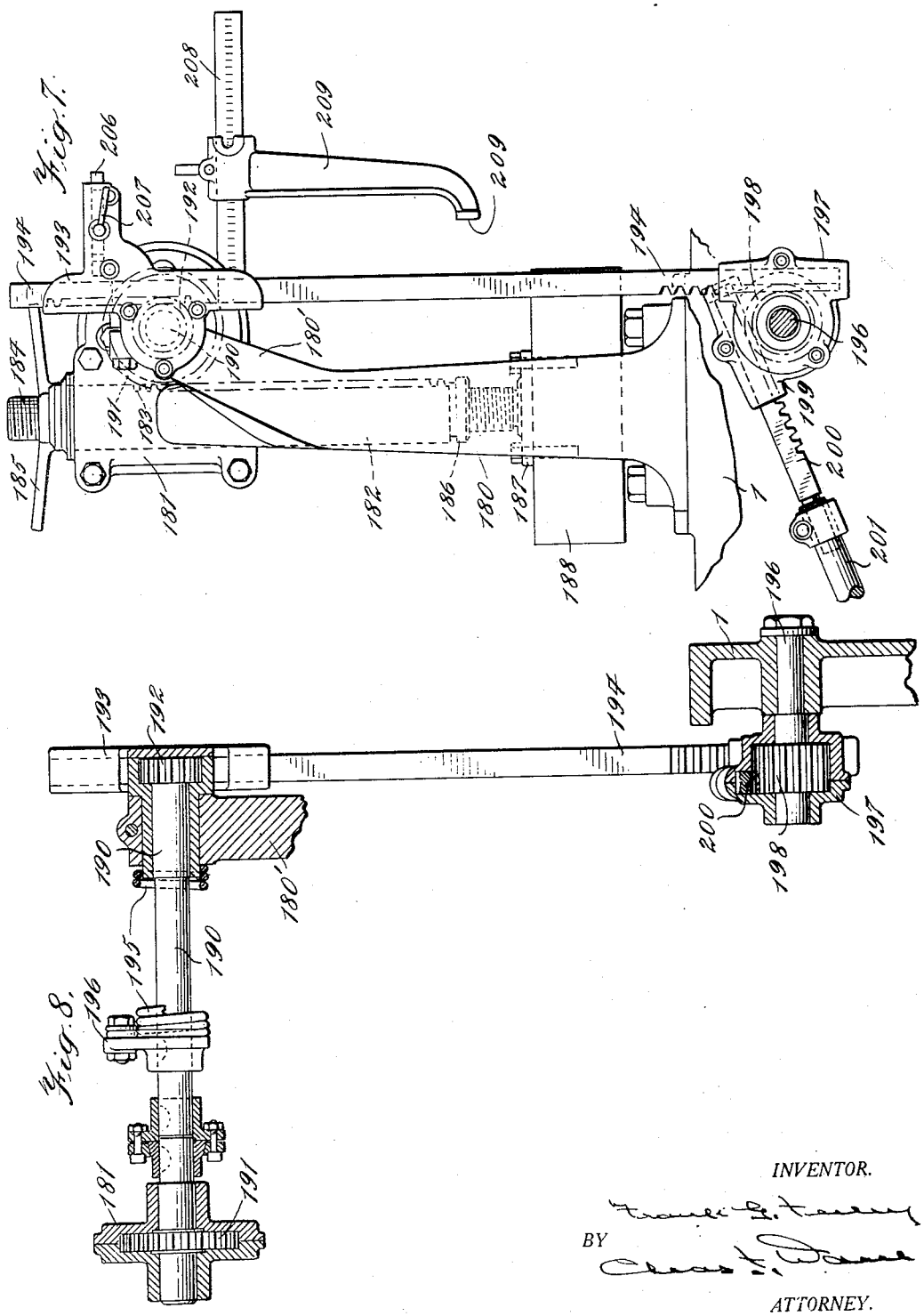

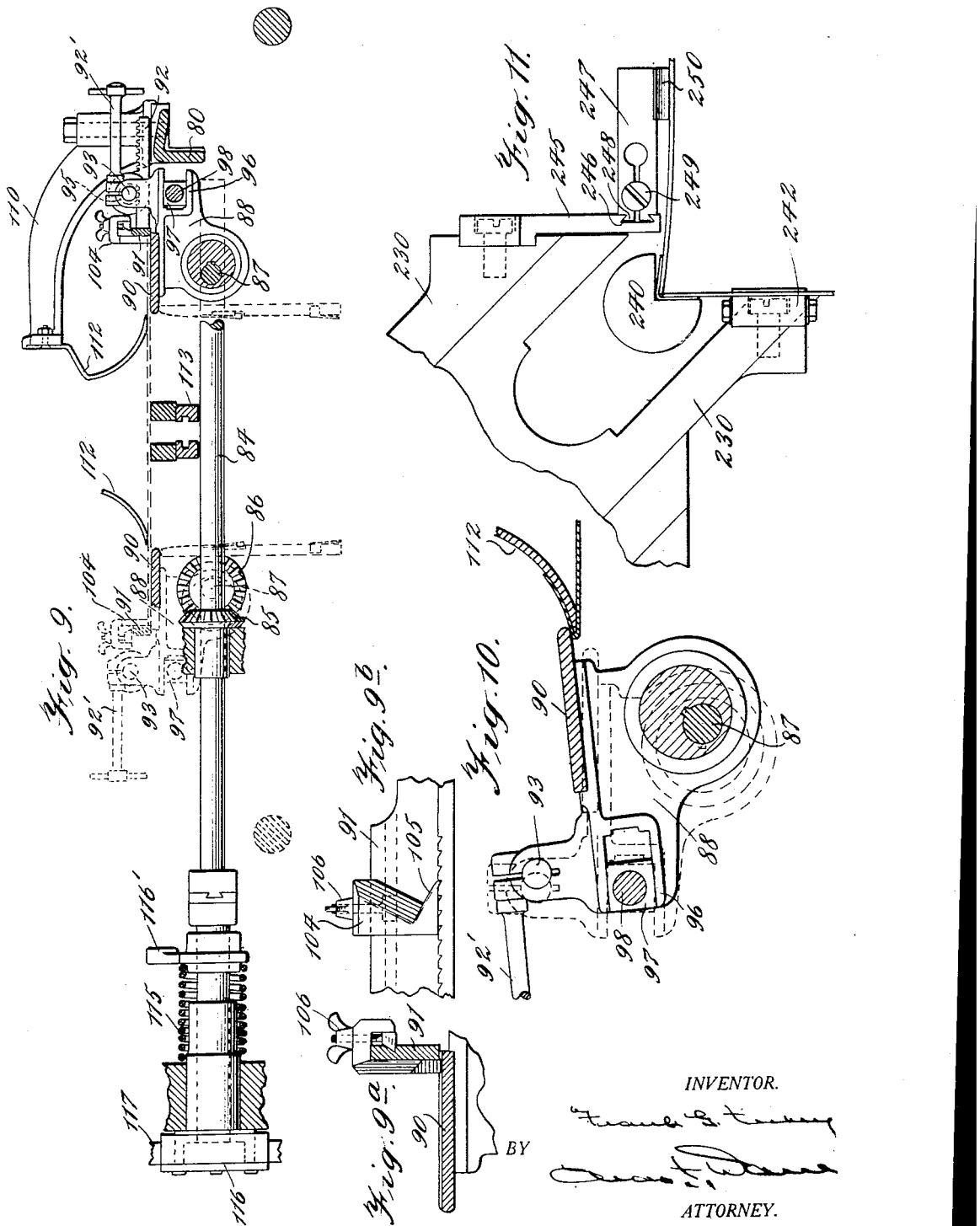

Oct. 9, 1928.　　　　　　　　　　　　　　1,687,289
F. G. FEELEY
PAPER BOX MAKING MACHINE
Filed June 30, 1925　　12 Sheets-Sheet 8
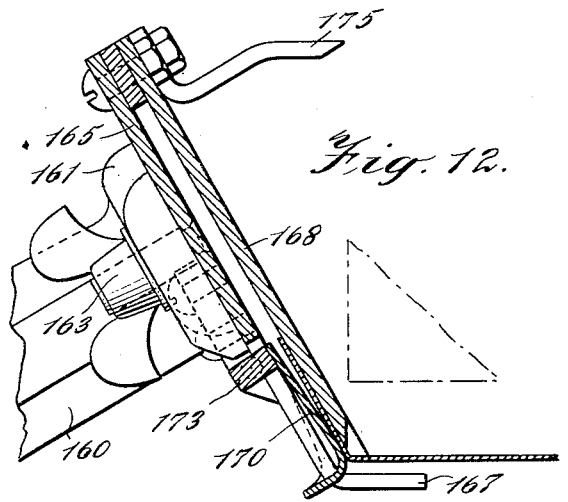
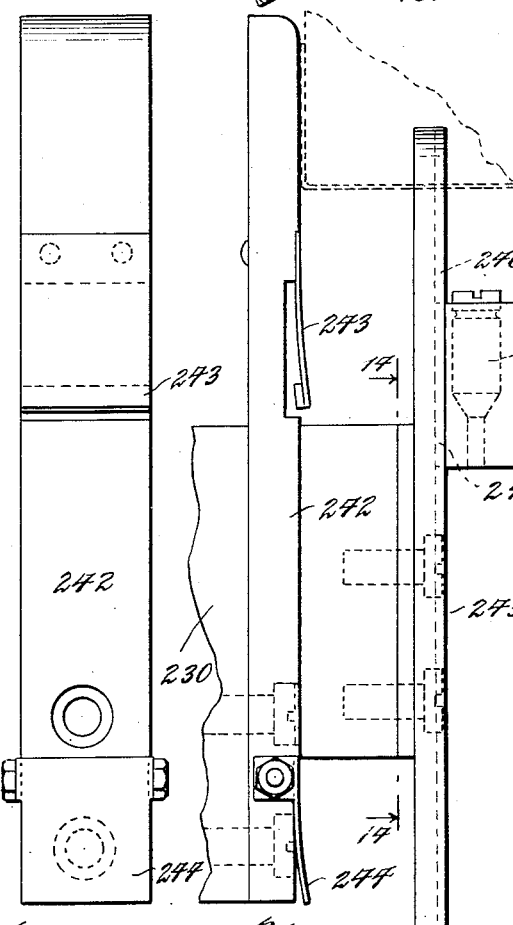
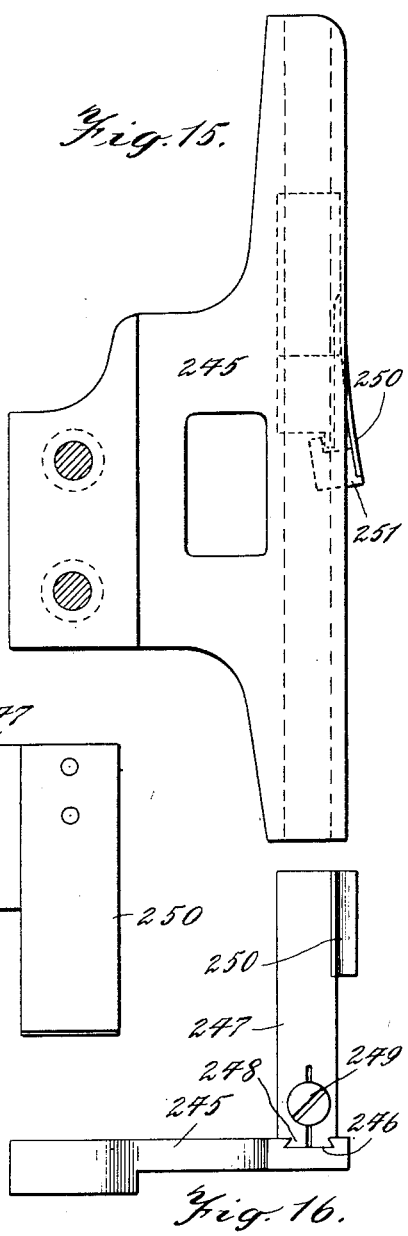
INVENTOR.
BY
ATTORNEY.

Oct. 9, 1928.  
F. G. FEELEY  
1,687,289  
PAPER BOX MAKING MACHINE  
Filed June 30, 1925   12 Sheets-Sheet 9
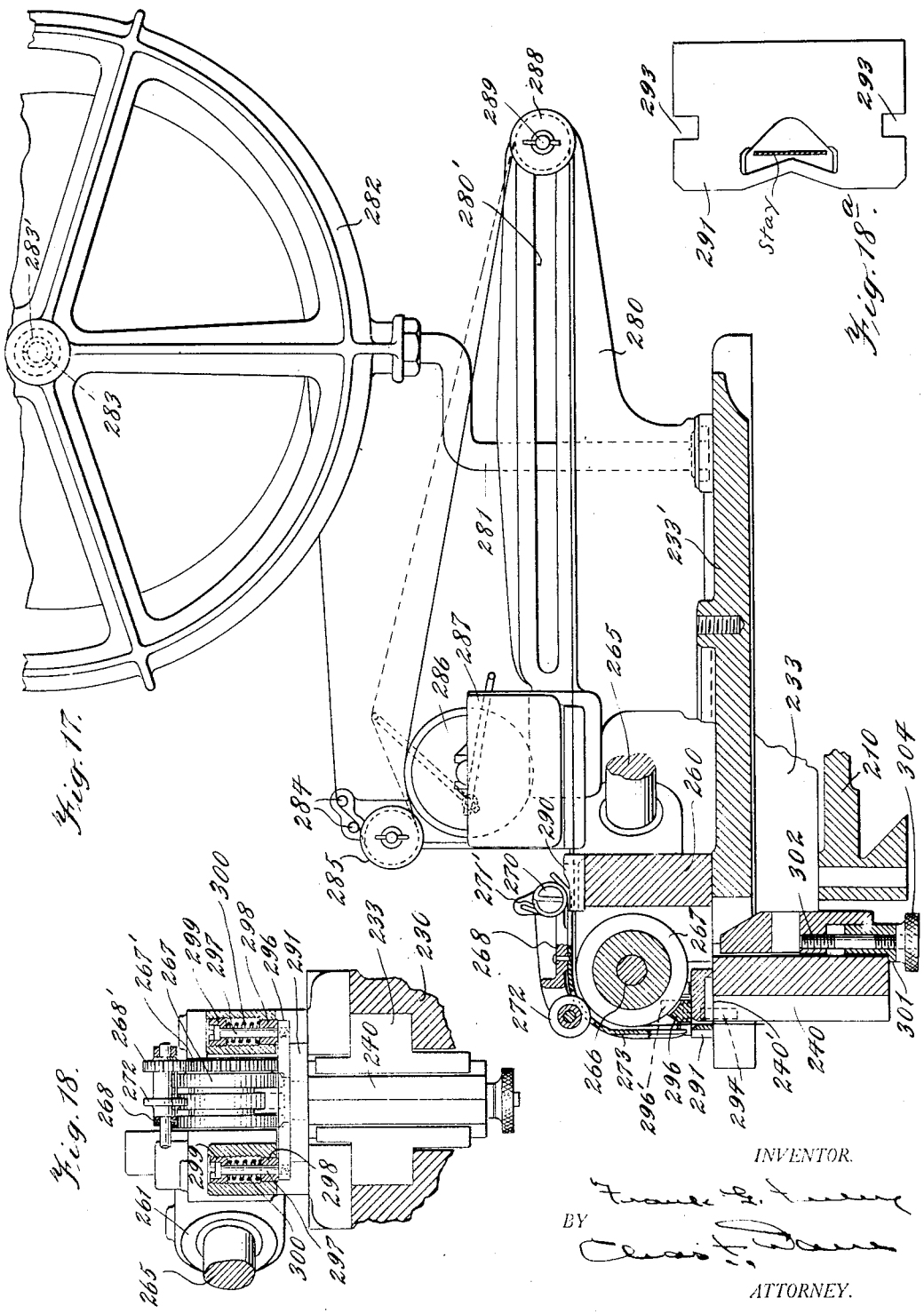

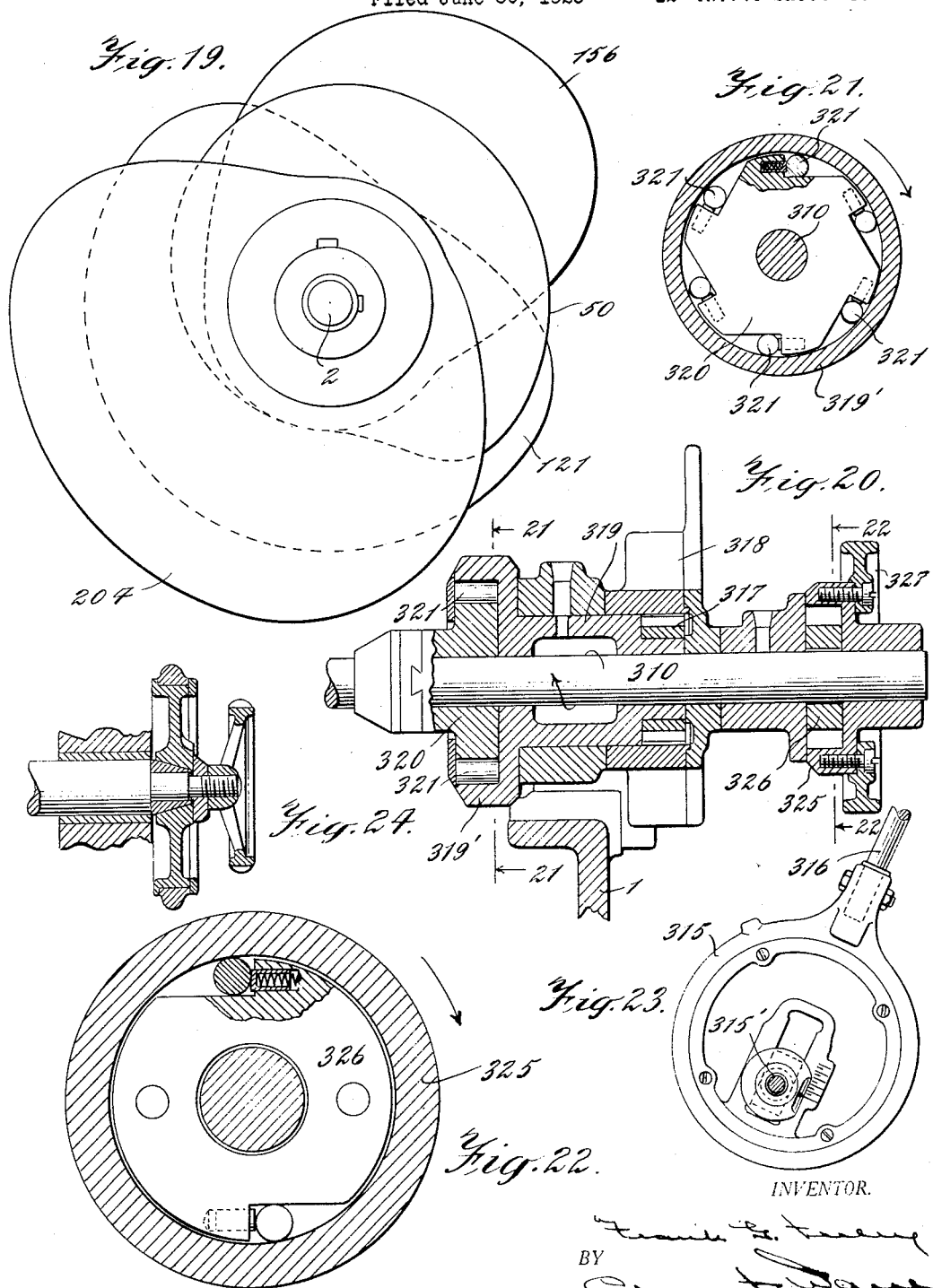

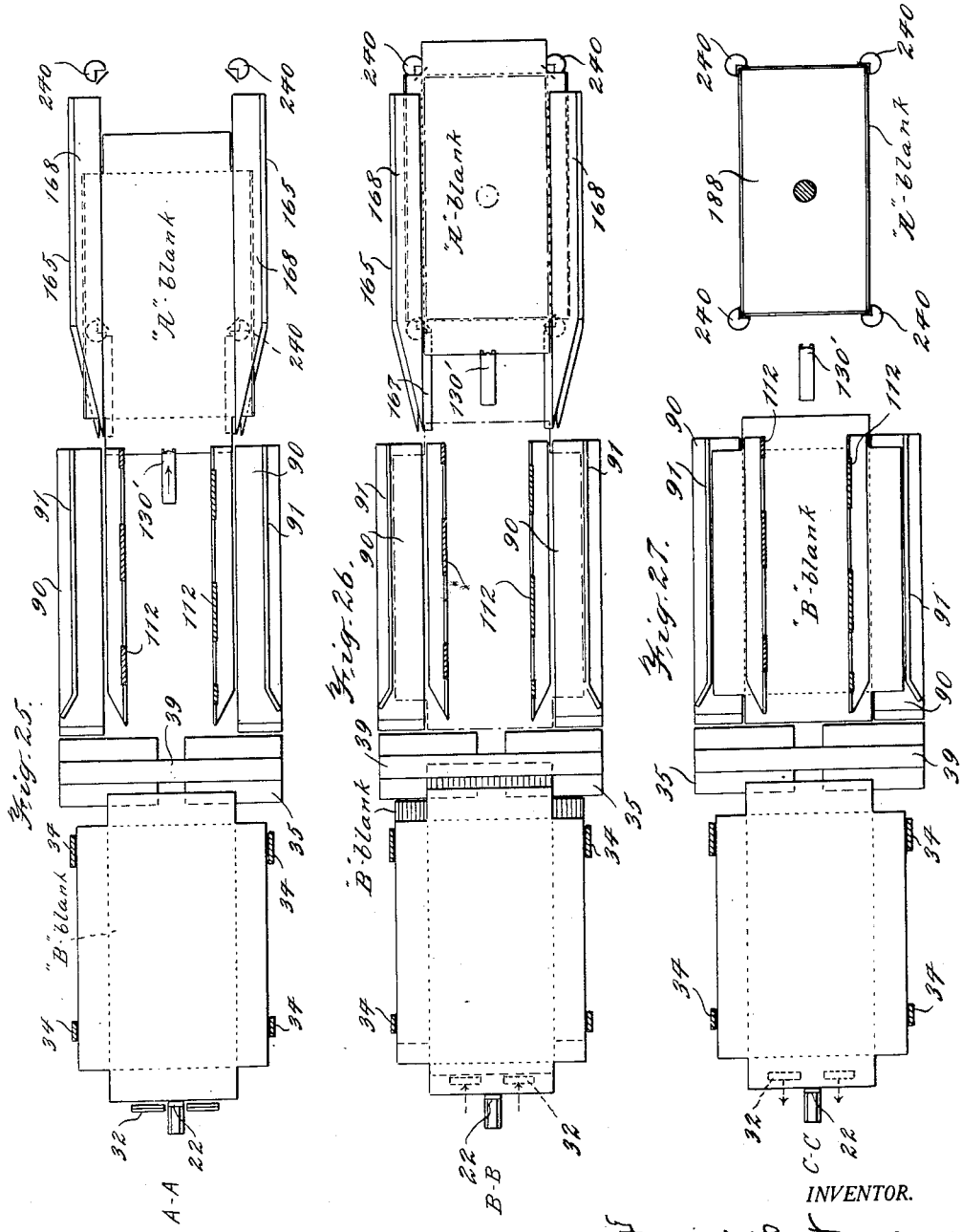

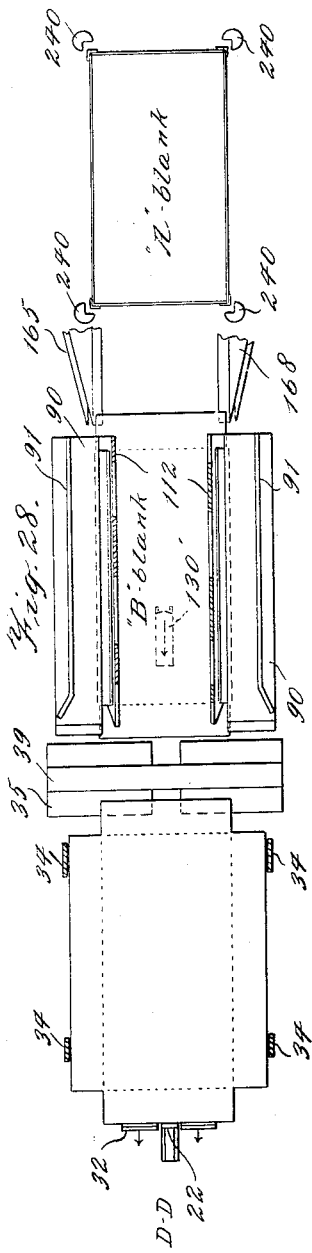
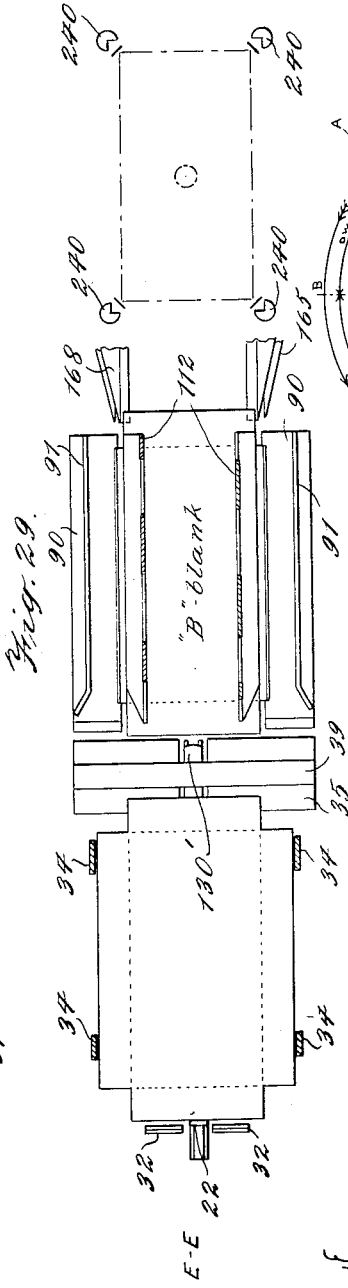
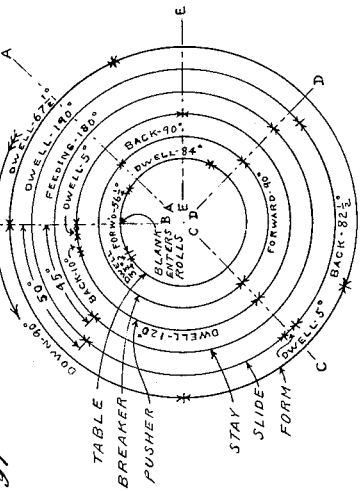

Patented Oct. 9, 1928.

1,687,289

UNITED STATES PATENT OFFICE.

FRANK G. FEELEY, OF CHICAGO, ILLINOIS, ASSIGNOR TO M. D. KNOWLTON COMPANY, OF ROCHESTER, NEW YORK, A CORPORATION OF NEW YORK.

PAPER-BOX-MAKING MACHINE.

Application filed June 30, 1925. Serial No. 40,571.

The invention relates to box forming and staying machines adapted to operate upon preformed and scored blanks of various sizes, to break or fold the blank to its ultimate shape and to apply binding strips or stays to the four corners simultaneously. To this end, the invention comprises, in a continuously operating machine, special mechanism for feeding individual blanks from a magazine to and through a novel form of breaker or folder, which bends the sides of the blank to an acute angle with the plane of the bottom, thence to a locator device which accurately positions the blank under the former and adjusts the angular relation of the sides to receive said former, which latter then moves the blank from the locator to a position opposite the pressure heads and stay applying devices; the machine also involving special spring actuated mechanisms for effecting the various positive sequential operations on the blanks, which insure the apparatus against damage in the event of obstruction, and means for readily and accurately adjusting the various operating devices to accommodate blanks of various sizes.

The invention is illustrated in the accompaying drawings, in which:—

Fig. 2 is a front end elevation.

Figure 1:
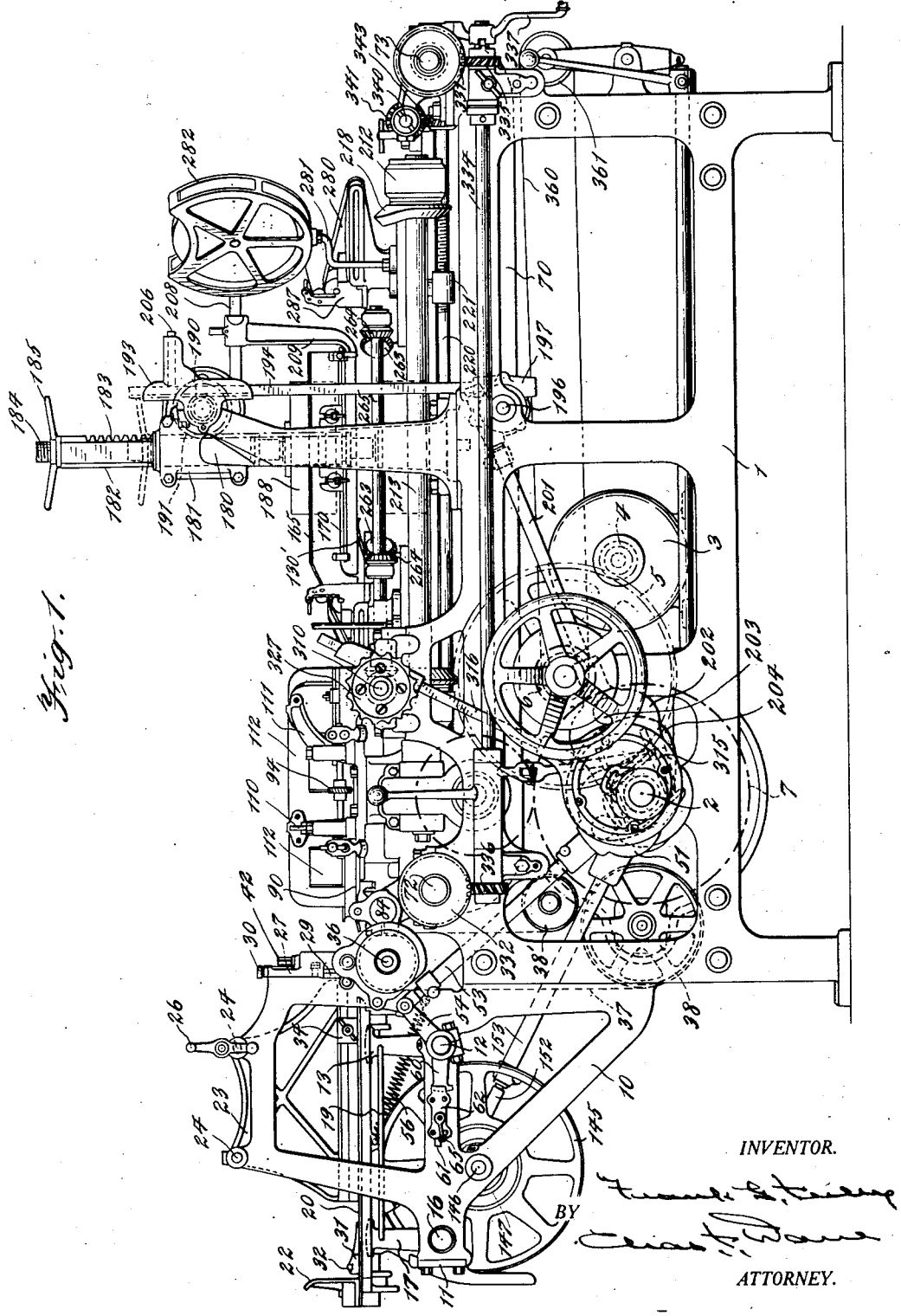
Fig. 1 is a side elevation of the machine, certain of the elements being omitted to avoid possible confusion.

Fig. 2ª is a sectional elevation of a feed table operating and supporting mechanism.

Fig. 2ᵇ is a similar view showing another section of this apparatus.

Fig. 3 is an enlarged sectional side elevation of the front part of the machine.

Fig. 3ª is a detail view of a lock-out device for the table feed actuating means.

Fig. 4 is a partial plan view of the machine, certain of the elements being omitted to avoid confusion.

Fig. 5 is a side elevation, partly in section showing the feed bar, the locator mechanism and the former.

Fig. 6 is a fragmentary plan view of the forward part of the feed bar.

Fig. 7 is a fragmentary side elevation showing the former and its operating mechanism.

Fig. 8 is a transverse vertical section through the former operating means.

Fig. 9 is a transverse section through the breaker or folder device.

Fig. 9ª is a sectional elevation of a part of the breaker or folder mechanism, illustrating a special form of stop for operating on the blank.

Fig. 9ᵇ is a fragmentary side elevation of the stop and its supporting means.

Fig. 10 is an enlarged sectional elevation of one of the breaker or folder devices.

Fig. 11 is a fragmentary plan, on an enlarged scale, of one of the pressure heads.

Fig. 12 is a vertical section through one of the locator devices.

Fig. 13 is a front elevation of one of the folding posts.

Fig. 14 is a side elevation of the same and a front elevation of the cooperating folding post on one of the pressure heads.

Figs. 15 and 16 are detail views of the last mentioned folding post.

Fig. 17 is an elevation, partly in section, of one of the pressure heads and its associated stay feeding mechanism.

Fig. 18 is a fragmentary sectional elevation of the latter.

Fig. 18ª is an enlarged plan view of the upper or stationary stay cutting knife, removed from its associated parts as shown in Figs. 17 and 18.

Fig. 19 is a detail view of the operating cams.

Fig. 20 is an enlarged sectional view of part of the stay feed actuating means.

Fig. 21 is a section on line 21—21 of Fig. 20.

Fig. 22 is a section on line 22—22 of Fig. 20.

Fig. 23 is a sectional elevation of the adjustable eccentric, which operates the stay feed actuating mechanism.

Fig. 24 is a sectional detail view of the means for adjusting the operating eccentric shown in Fig. 23.

Figs. 25, 26, 27, 28 and 29 are diagrams illustrating the sequential operations of the machine.

Fig. 30 is a timing diagram.

*Magazine and feed table.*

Referring more particularly to Figs. 1 to 3, inclusive, 1 indicates the main frame of the machine, preferably made up of side and end castings, in which is journaled a transverse main shaft 2 driven by an electric motor 3, mounted within the main frame, the shaft of the motor being connected to main shaft 2 by a train of reducing gearing 4, 5, 6 and 7.

Secured to the front end of the main frame are two skeletonized brackets 10, 10 connected at their front ends by a cross bar 11, which brackets serve as supports for the blank magazine, feed table and certain other accessories of the machine. Journaled in the brackets 10, 10. is a cross shaft 12 upon which are rigidly secured two rocker arms 13, 13 the outer ends of which are finished with a short gear segment 15 and a plain segmental surface 14, the gear segment meshing with a rack 21 on the under side of feed table 20 and the cylindrical surface 14 constituting a rocker bearing for the table, as indicated in Fig. 2ª. Mounted upon studs 16 fixed to the forward portions of the brackets 10 are two rocker arms 17, 17 finished at their outer ends with segmental cylindrical surfaces 18 cooperating with the plain surface on the bottom of the table 20. The two sets of rocker arms 13 and 17 on opposite sides of the machine are each coupled by connecting rods 19. The table is thus constructed and arranged to reciprocate horizontally with no sliding friction, the reciprocation being effected by the cooperating gear segments 15 and racks 21 and the cylindrical arcuate ends of the rocker arms support the table with a roller-like action, thereby reducing friction of the moving parts to a minimum.

The table 20 is preferably formed as a single casting provided with a ribbed upper surface and a central longitudinal slot or opening in which is located a stationary guide rail 21'. Adjustably mounted on the table 20 is a feeder block 31, the rear transverse portion of which is divided into two lateral sections to receive hardened steel feeder lips 32, which are of different heights on the opposite feeding edges and are reversible in the block to present either the high or low feeding edge to the blanks, when feeding heavy or light weight blanks. Adjustably mounted on the stationary guide rail 21' is a vertical back stop 22, which, with the front member 27 vertically suspended between the brackets 10, 10, serves to confine the blanks endwise on the table and in the magazine. The front stop 27 carries a slide or gate 29 which is vertically adjustable by means of a set screw 30, so that the lower edge of the slide or gate may be raised or lowered with respect to the top of the table to permit the discharge of one blank at a time, the adjustment being necessary to accommodate blanks of varying thickness.

The magazine sides 23 are in the form of cast plates suspended from transverse rods 24, 24 (Fig. 2) secured in the upper portions of the brackets 10, 10, said plates being slidable on said rods transversely of the table to accommodate blanks of different widths, the adjustment of the sides being effected by means of a shaft 25 having threads of opposite pitch on its respective ends engaging lugs 25' on the plates 23, said shaft 25 being operated by a crank 26 secured to one end thereof. The magazine sides 23 do not extend down to the top of the table 20, as it is desirable to have the feeder block 31 as wide as possible, so as to engage a considerable extent of the edge of the blank which is being fed in order that the feeding motion may be straight and true. It is also desirable to have the magazine sides as long as possible to properly confine long blanks. Therefore, when blanks narrower than the feeder block 31 and shorter than the sides 23 are being handled, the feeder block must move under the lower edges of the magazine sides. In order to confine the lower part of the blanks under such conditions, adjustable extension side pieces 34 are secured to the lower edges of the magazine sides 23.

Journaled in housings formed as rearward extensions of the brackets 10, 10 is a shaft 36 carrying a lower feed roll 35, which cooperates with an upper feed roll 39, mounted in bearings on the lower ends of vertical slide rods 40, supported in the extensions or brackets 10 on opposite sides of the machine, each of said rods being acted upon by a coil spring 41 tending to force the upper roll 39 toward the lower roll 35, and the rods being adjusted to separate the rolls by a space a little less than the thickness of the blanks being fed to prevent jumping of the upper roll when the blank enters the rolls, said adjustment being effected by nuts 42. This mounting of the upper roll provides a fairly uniform and constant pressure on the blanks in spite of variation in thickness of the stock and permits the rolls to separate by movement of the upper roll, if, by accident, two or more blanks are simultaneously fed from the magazine. The lower feed roll 35 is driven by a belt 37 from a pulley 38, which is operated by suitable gearing from the main shaft 2, the driving pulley being preferably provided with a suitable belt tightener 38' to maintain a proper tension on the drive belt 37.

As indicated, the feed table 20 is reciprocated by the oscillation of the two sets of rocker arms 13 and 17. In order to effect the rearward motion of the table away from the feed rolls, a positive driving connection is provided as follows: A cam 50, fast to main shaft 2, is engaged by a roller 52 pivoted to fork 51, which straddles the hub of the cam 50, said fork having adjustably secured thereto a connecting rod 53, the opposite end of which is connected to a crank arm 54 secured to shaft 12 upon which the rocker arms 13 are fixed. It will be seen, therefore, that the cam 50 actuates connecting rod 53 in one direction only, namely, in its outward movement from shaft 2, this movement effecting the retraction of the table 20 as the rocker arms 13 and 17 are moved toward the left, as shown in Fig. 3. The feeding movement of the table and the return of connecting rod 53 to its normal position is accomplished by helical springs 56 connected to the under side of the table and to the brackets 10, 10. The advantages of employing the springs to effect the active or operative movement of the feed table are that the feeding movements are uniform and may be effected with great rapidity, but will nevertheless be instantly suspended should the blank being fed meet with an obstruction sufficient to damage or derange any of the parts of the apparatus, since, under such conditions, the springs 56 will yield and the feeding motion of the table would be arrested immediately.

It is frequently necessary or desirable to stop the feeding action of the table while the machine is in motion and this operation is effected by means of a hold-out latch, which is so constructed and arranged as to be operable to engage or release the feeding apparatus when the table is at the rear extremity of its stroke, that is to say, when the cam roller 52 is on the highest part of the cam 50. The mechanism to effect this object comprises an extension 60 of crank arm 54, which has an arcuate end adapted to be engaged by a bolt 61 slidably mounted in a housing 62 on bracket 10, said bolt being actuated by springs 66 and 67 interposed between the bolt and an eccentric actuator 63 mounted on shaft 64 provided with an operating handle 65. By turning the handle in one direction, the bolt 61 is advanced to engage the arcuate end of arm 60 of crank arm 54, when the latter has been moved to its upper position to retract the table, the frictional engagement between the bolt and the arm 60 being sufficient to prevent the table being returned by the springs 56. The friction caused by the side thrust of arm 60 against bolt 61 is also greater than the force exerted by actuating the spring of the bolt, this making it impossible to withdraw the latch at the wrong time and cause damage which might result if the cam roller 52 was some distance away from its cam when release of the hold-out latch is effected. The handle 65 of the bolt may be operated in either direction, at any time, but the bolt 61 will not engage or disengage the arm 60 except when the cam roller 52 is on the high point of its cam and the table 20 is in its extreme retracted position.

Breaker or folder.

The table 20 moves forward in the feeding operation with the uniformly accelerated motion imparted by springs 56, so that, when the front end of a blank enters the feed rolls, it is moving at substantially the same speed as the rolls, which is sufficient to advance the blank into the breaker or folder mechanism, which is effective in bending or folding the sides of the blanks along the lines of the scorings until the sides form an acute angle with the body of the blank. The breaker or folder mechanism is illustrated in its structural and operative relation in Figs. 1 and 3 and as to certain of its details in Figs. 9, 9ª, 9ᵇ and 10.

Journaled in bearings near the upper front and rear of the main frame 1 are transverse shafts 72 and 73, between which extend two longitudinal girders 70, which are adapted to be adjusted toward and from each other transversely of the machine, as will be hereinafter explained, the ends of the girders having collars which embrace the shafts 72 and 73. Secured to the upper front portions of the girders 70 are composite frames or brackets 80, 80, shown in plan in Fig. 4, each of said brackets including aligned journal bearings 81, 82 in which are mounted shafts 87, 87, each of which shafts has a bevel-gear 86 fixed to its forward end, which meshes with a companion bevel-gear 85 mounted in a bearing 83 formed on the corresponding bracket 80, said gears 85, 85 being splined upon a transverse shaft 84 journaled on the side members of the main frame 1, so that said gears 85, 85 will not only slide freely longitudinally of the shaft 84, but will be rotated or oscillated by said shaft and impart a corresponding movement to shafts 87, 87. Fixed upon each shaft 87, adjacent the bearings 81 and 82, are two eccentrics, upon each of which is journaled a bracket 88, each pair of brackets supporting a folder plate 90, the two folder plates, located on opposite sides of the longitudinal axis of the machine, extending from a point adjacent the feed rolls toward the rear of the machine, as indicated in Figs. 1, 3 and 9, and parallel with the fixed central guide rail 113. Slidably mounted in the upward extensions of each pair of brackets 88 are rack bars 92, to the inner ends of which is secured a guide bar 91, extending parallel with the outer edge of the folder plate 90, the two guide bars 91 on opposite sides of the machine serving to guide the blanks over the folder plates and prevent lateral twisting of the blanks. Each guide bar 91 is adjustable relative to its cooperating folder plate 90 and transversely of the machine, by a shaft 93 journaled in brackets 81 and 82, said shaft having pinions 95 secured near its ends, meshing with the rack bars 92, and a knurled collar 94 near its middle by which it is rotated, said shaft being locked in its various positions by setting up a clamp screw 92' engaging one of the shaft bearings (Fig. 9). Adjustably clamped to each of the guide bars or side gauges 91 is a stop 104 provided with an inclined surface 105 overlying the top of folder plate 90, up which inclined surface the front corner of the blank rides as the blank is fed into the breaker mechanism, the stop being secured to the side gauge 91 by a suitable clamp 106.

Mounted upon the brackets 80 on each side of the machine are two generally arc-shaped arms 110 and 111 to the outer ends of which are attached stationary shoes 112, which are curved downwardly and outwardly, so that their lower edges lie adjacent the inner edges of the folder plates 90. The shoes 112 have complementary sections of their opposing surfaces cut away, so that the inwardly curved portions of said shoes may intermesh when narrow blanks are being operated upon, as indicated in Figs. 1 and 3.

Each of the brackets 88 is provided on its outer face with a slotted guide 96 in which is slidably mounted a block 97 mounted upon a pin 98 secured in the corresponding bracket 81 or 82, the block 97 acting as a sliding fulcrum upon which the corresponding bracket 88 and the folder plate 90 carried thereby rocks, when oscillatory motion is imparted to the supporting shaft 87.

In the normal operation of the machine, the folder plates 90 are oscillated past the adjacent edges of the shoes 112 for the purpose of first bending the sides of the blank upward over the lateral edges of the shoes and then downwardly into engagement with the curved surfaces of the shoes, as indicated in Figs. 9 and 10. The oscillation of the folder plates 90 is effected by the corresponding oscillation of shaft 84 and the gear mechanism connecting the same with the brackets 88, as hereinbefore explained. Shaft 84 is rotated in a direction to move the folder plates to their normal or horizontal position, indicated in Fig. 9 in full lines and in dotted lines in Fig. 10, by mechanism similar to that employed for retracting the feed table, said mechanism including a cam 121 mounted upon the main shaft 2 provided with a fork 119 carrying a roller 120 engaging the surface of the cam, the fork carrying an adjustable connecting rod or pitman 118 upon the outer end of which is secured a rack 117 operating in a guide frame 116 surrounding the outer end of shaft 84, said rack meshing with a pinion fast to the end of the said shaft. The rotatory motion of shaft 84 to impart operative movement to the folder plates 90 is effected by a helical spring 115, one end of which is fixed to a collar 116' fast to the shaft and the other end anchored to the bracket on the main frame in which the shaft is journaled. By this means, the operative stroke or movement of the folder plates is produced solely by the tension of the spring 115, so that, in the event of the blanks becoming damaged, deranged or jammed in the machine, or any of the operative parts of the breaker mechanism becoming displaced so as to prevent the normal operation of the mechanism, the spring 115 will yield and rotation of the shaft 84 and the operative movement of the folder plates and their appurtenant parts will be suspended.

Pusher or transfer element.

In order to move or transfer the blank, after its sides have been folded over the breaker, into a locator to be presently described, there is provided a pusher or transfer element comprising a pawl member 130' pivoted between two side bars 130 and normally held in elevated position, as indicated in Fig. 5, by a spring 130''. The side bars 130 are separated by studs and spacers 131 and have secured to their outer faces shoes 132 which slide in longitudinal grooves in the central guide rail 113, which extends back to the feed rolls 35 and 39 and which is supported at its forward end by a bracket 133 mounted on cross shaft 134 (Figs. 5 and 6).

The means for actuating the pusher comprises a belt 140 running over an idler pulley 137, to which belt the pusher pawl carriage, formed by the side bars 130, is secured by means of a spacer block 135 and a clamp 136. The belt 140, which is preferably a steel band, runs longitudinally of the machine, one reach passing over a forward idler pulley 141, mounted in a bracket 142 adjustably attached to the central guide rail 21 and providing for proper adjustment of the tension of the belt or band 140, and thence over an oscillating wheel or pulley 145 mounted on shaft 146 journaled in the brackets 10, the ends of the steel band being secured to the rim of pulley 145 by a suitable clamp 148. The pusher wheel or pulley 145 is adjustably clamped to a hub 147 on shaft 146, so that the wheel or pulley may be adjusted to various angular positions relative to the hub, whereby the position of the stroke of the pusher pawl 130' may be adjusted, when required. The pusher wheel 145 is operated in a direction to retract the pusher pawl and its carriage by means of a cam 156 mounted on the main shaft 2, which cam engages a roller 155 on yoke 154, to which is adjustably attached a connecting rod 153 which has a rack bar 152 adjustably secured on its outer end, said rack bar engaging a pinion 157 on the hub of the pusher wheel 145. The active stroke or oscillation of the pusher frame is effected by a spring 150 surrounding and connected at one end to the shaft 146 and with its other end fixed to the machine frame. It will be seen, therefore, that the operating or working stroke of the pusher pawl is effected by the spring alone, while the cam 156 and connections between the same and the pusher wheel 145 is effective only in producing the return or non-working stroke of the pusher pawl, so that if the pawl meets any undue resistance, such as an unfolded or torn blank, in its feeding operation, the spring will yield and no damage will be done to the mechanism.

When the pawl has carried the blank to its proper position in the locator and under the form, to be hereinafter described, and the end of the blank engages the adjustable stop 209, see Fig. 5, it makes a short dwell, then moves back a short distance to permit the form block to carry the blank downward and clear the lower lip of the pawl. This short withdrawal movement of the pusher pawl mechanism is followed by another dwell, during which time the next blank is fed into the folder or breaker, which starts the folding of the sides of the succeeding blank at the same time that the pusher pawl starts back, thus supplying sufficient force to the succeeding blank to prevent the latter being carried back by the friction of the pawl as it passes beneath and in engagement with its under surface, the pawl being depressed by the blank, when passing underneath it, and the outer end of the pawl is elevated by the spring 130'', to clear the rear edge of the blank being fed into the breaker and positions the pawl ready to engage this blank to push it forward into the locator.

*Locator.*

This device is designed to receive the blank as the latter is advanced through the breaker or folder by the pusher and to bend the sides of the blank outwardly at an angle of approximately 75 degrees with the horizontal, so as to permit the blank to be engaged by the form. As indicated more particularly in Figs. 1, 5 and 12, the locator comprises two sets of parallel plates 165 and 168 with their forward ends pointed, as indicated at 166 and 169, to engage the inside and outside of the angular folds of the blank sides, as the blank leaves the breaker. The locator plates are supported for vertical adjustment on the flat face 161 of arc-shaped brackets 160 secured to the longitudinal girders 70, each set of locator plates being clamped to the bracket member 161 by screws and nuts 163 engaging slots 162 in the bracket section 161. Each plate 165 has an inturned flange 167 at its bottom, which underlies the blank and prevents the latter dropping in its movement into the locator. The lower portion of each plate 165 to the rear of the flange 167 is cut away and, in the cut away portion, there is hinged a plate 170 supported on a rod 173 and acted upon by an adjustable tension spring 174 to exercise a yielding pressure on the outside of the side flanges of the blank, as illustrated in Fig. 12. The spring tension of the hinged plates 170 is properly adjusted to act as a brake and absorb the momentum of the blank as it is being pushed up to the stop 209, thereby preventing jamming of the ends of the blank when the machine is running at high speed. The spring plates, however, swing out and relieve the tension on the side flanges of the blank, when the blank is engaged by the form. Secured to the upper edge of the inner locator plate 168 is a depth indicator 175, which is located at a point above the stay cut line, a distance equal to the vertical stroke of the form, and facilitates the setting of the form for varying depths of boxes, as it indicates the position of the stay cut line on the form when the latter is at the top of its stroke. As indicated, the locators are mounted on supports carried by the adjustable girders 70, and may be readily removed from the supports for the purpose of adjustment, repair, cleaning, etc.

*Form element.*

Removably mounted on the upper rails of the main frame 1 and spanning the machine transversely, is an arch-shaped support 180, preferably formed as two sections with a split bearing 181 at its mid section and highest point, in which bearing there is mounted for vertical reciprocation an octagonal sleeve 182 which fits the correspondingly shaped bore of the bearing 181 and is thereby prevented from rotating in said bearing. Carried by the sleeve 182 is a threaded spindle 184, which is adjustable within the sleeve by means of set nuts 185 and 186 engaging the screw threads on said spindle and the respective ends of the sleeve 182, as shown in Fig. 7. One face of the sleeve 182 is provided with a longitudinal rack 183. The lower end of the spindle 184 is provided with a flange 187 to which is secured the form 188, which may be made of wood, metal or other suitable material and is made of a size to fit the inside of the finished box. This form may be made as a solid block or, if desired, may be made of adjustable sections to vary the width and length of the sides and ends to accommodate different sizes of boxes to be operated upon.

The purpose of the form 188 is to engage and carry the blanks from the locator to a position opposite the pressure heads and serve as an anvil with which the pressure heads coact in applying the stays to the corners of the box. In order to effect these operations sequentially, the form is adapted to be reciprocated in a vertical direction and this reciprocatory movement is effected by a pinion 191 engaging the rack 183 on the sleeve 182, said pinion being fast on a shaft 190 journaled in a lateral bracket extension 180' of the arch frame 180, said shaft carrying a second pinion 192, which is engaged by the teeth on the upper end of a rack bar 194 slidably mounted in a housing 193 secured to the bracket member 180', as more particularly shown in Figs. 7 and 8. Surrounding the shaft 190 is a helical spring 195, one end of which is anchored to a collar 196 fast to the shaft 190 and the other end is anchored to the bracket member 180'. The rack bar 194 is slidably supported at its lower end in a housing 197, mounted on a stub shaft 196 fixed to the main frame 1, which stub shaft carries a pinion 198 which meshes with the teeth on the lower end of the rack bar 194 and also with the teeth on a rack bar 200 adjustably mounted in the end of a connecting rod 201, the lower end of which is secured to a yoke 202 which straddles a cam 204 on the main shaft 2 and carries a roller 203 which engages the surface of the cam. The spring 195 furnishes the motive power for effecting the downward or working stroke of the form, and the cam, connecting rod, rack bars and pinions effect the return or idle stroke of the form. It will be thus seen that, if the form, in its descent, meets an obstruction, the spring will yield and the mechanism will not be damaged. The cam 204 is so fashioned as to cause the form to dwell at the top of the stroke long enough to permit the pusher pawl 130' to advance the blank under the form until it is arrested by stop 209 which is supported, for adjustment longitudinally of the machine, upon the bracket 208. Likewise the cam is fashioned to produce a dwell at the bottom of the stroke of the form long enough for the four pressure heads to press the stays on the corners of the box.

Means is provided to start or stop the motion of the form element only at the top of the stroke, which means is a spring pressed bolt or latch, similar to that employed in connection with the table stop latch, and, in this case, comprising a bolt 206 slidably mounted in an extension or housing 193 and provided with a handle 207.

*Stay pressure heads.*

These elements, four in number, are adapted to cooperate with the form in bending the side and end flanges of the box to proper position for the application of the stays to the corners and are illustrated in detail and general arrangement in Figs. 1, 4, 11 and 13 to 16, inclusive. The four stay pressure heads are illustrated in detail and in their relative arrangements in Fig. 4, and are mounted on the machine for simultaneous adjustment, both longitudinally and transversely of the machine, to operate upon boxes of varying sizes, and a description of the construction and operation of a single stay pressure head will apply to all.

Slidably mounted on the longitudinal girders 70, 70 is a casting 210 having a lateral extension 212 in the form of a split sleeve surrounding a longitudinal shaft 213, the forward end of which is journaled in a bearing 217 forming a lateral extension of the bracket 80. Journaled in the split sleeve 212 and splined to shaft 213 and, therefore, rotatable with but slidable upon said shaft, is a cam 218. Formed on the upper face of the plate 210 are parallel spaced guide flanges 230 in which is mounted the pressure slide which consists of two main elements, namely, a forked section 231 in which is journaled a roller 232 cooperating with the face of cam 218, and a main slide comprising a generally rectangular skeleton frame 233 which carries, at its outer end, the die 240. An anvil stud 234, mounted in the rear cross member of the slide 233, bears upon the forked member 231 and engages a pressure spring 235, which is held on a longitudinal stud passing through the slide 233 and bears, at its outer end, upon a cross stay midway of said slide, the purpose of this spring connection being to transmit the motion from the cam 218 to the anvil 240 through said spring 235, which latter will yield to accommodate any variation in thickness of stock of the blank, so that the mechanism will not be damaged. The return movement of the slide is accomplished by a spring 236 acting against stationary stud 238 and the middle cross bar of the slide member 233.

Each of the pressure heads is provided with two folding posts, by means of which the end and side flanges of the blank are held firmly against the sides of the form while the stay is being applied and pressed against the corners of the folded blank. These folding posts are shown in their operative relations on the four stay pressure heads in Fig. 4 and are illustrated in detail in Figs. 11 to 16, inclusive. Each pair of folder posts is secured in parallel vertical arrangement on the ends of the guides 230 in which the corresponding pressure slide operates. Each side folding post 242 is bolted in vertical position on the end of the extension of guide 230, which lies adjacent the side of the box blank and is provided with a spring stripper 243 near its upper end, which serves to strip the finished box from the form as the latter ascends. A spring clip 244 secured to the lower end of the post 242 cooperates with similar spring clips on the corresponding posts to yieldingly engage the finished boxes and prevent them from dropping until entirely free of the posts, so that only one box will drop upon the delivery belt at each cycle, as more than one box dropping at a time might jam the delivery or interfere with the subsequent operations of the machine. Each end folding post 245 is secured to the projecting end of the guide member 230 which lies adjacent the corresponding end flange of the box in process of formation. This post preferably takes the form of a casting or stamping, shown in detail in Figs. 11, 14, 15 and 16, and, in addition to the post proper, includes a special form of crimper designed to prevent the bulging of the box ends when the form is withdrawn and, therefore, removes the support from the inside of the box after the stays have been applied. This crimper is particularly adapted to operate upon the larger sized boxes, and it comprises a lateral arm 247 having a vertical sliding engagement with the side face of the post 245, the dovetailed joint formed by members 246 and 248 on the post and arm, respectively, being expanded into rigid locking engagement for the various adjustments of the crimper by means of an expansion stud 249 tapped into the split end of arm 247. Secured to the lateral face of the arm 247, which overlies the end of the box blank, is a spring 250 which engages the end flange of the blank as the latter is brought down by the form, in the manner shown in Fig. 11, and, therefore, holds this flange tight against the form while the stay is being applied to the box. A stop 251 on the bottom of the spring limits the outward movement of the said spring in its crimping action in order that the box may not be broken at the score line or the stay pulled loose. As before stated, the crimpers are adjusted vertically on their supports, so as to give the desired amount of crimp to the box ends, and preferably several sets of crimpers, projecting different distances from the folder posts, are supplied with the machine, so that the crimping action may be applied at points on the end flanges to give the best results with blanks of different widths.

As indicated, the form dwells within the box between the four sets of folder posts 242 and 245, while the stays are being applied to the corners of the box by the dies 240 carried by the stay pressure slides, and these four slides are operated to force the dies against the corners of the box by the four beveled cams 218, which are mounted in pairs on the splined shafts 213, which shafts are driven through spiral gears by the cross shaft 214, which is driven by a gear 7 on the main shaft meshing with a pinion on the outer end of the shaft 214, the spiral gear elements on said shaft 214 being splined thereto to permit them to slide on the shaft when the machine is adjusted to accommodate blanks of various widths.

The stay feed.

Associated with each of the stay pressure heads and carried by the cover plate which overlies the slide of the corresponding pressure head, is a stay feed which is operated to withdraw the strip of paper or other stay material from a reel, apply moisture to the gummed surface thereof and direct the gummed portion of the strip between the die 240 and the corner of the box to which the stay is to be applied, an appropriate length of the stay being severed by the forward or pressing movement of the die. The stay feed is illustrated in its application to the several pressure heads in Fig. 4, as to its structural details in Figs. 17, 18 is and 18ª and in its relatioto the other operative elements of the machine in Fig. 1. Referring to Figs. 4 and 17, 233' indicates the cover plate of one of the stay pressure heads, to which is bolted a casting 260 which carries the various elements of the stay feed, except the reel support, said casting including a pair of angularly disposed bearing sleeves 261 and 262 in which are journaled meshing beveled gears 264 and 263, respectively, which are operative to drive the stay feed rolls. The gears 264 are slidably mounted by a splined connection on shafts 265, the forward ends of said shafts being journaled in brackets formed as extensions of the castings 80 and having fast on these ends beveled gears 312, which mesh with beveled gears splined to a cross shaft 310 also journaled in bearings in the extension bracket of the casting 80, so that said gears 311 rotate with the shaft 310, but are slidable on said shaft to accommodate the lateral adjustments of the machine to boxes of various sizes, as will be hereinafter explained.

Each gear 263 is mounted upon a shaft 266 journaled in the forked forward portion of the casting 260 and mounted on said shaft 266 is the lower feed roll 267, which is peripherally grooved as shown in Fig. 18. Mounted on the same shaft adjacent the feed roll is a gear 267' adapted to mesh with a pinion 268' fast to the shaft of an upper feed roll 272, which shaft is journaled in a swinging frame 268 which is pivoted on a shaft 270 mounted in upstanding lugs 271 on the casting 260, the frame being yieldingly held in position to engage the feed rolls 267 and 272 by a helical spring 271'. Said swinging frame 268 also carries a guard 273 which extends over the lower feed roll and is provided with an opening through which the upper feed roll extends, as shown in Fig. 17.

Mounted upon a stem 281 secured to the cover plate 233' of the pressure heads is a reel frame 282 adapted to receive the rolls of gummed stay material, which are mounted in the reel frame by means of plug 283 carrying loose bushings 283' which are pushed through the hole in the center of the rolls. The object of these loose bushings is to prevent the rolls of stay material tightening up and turning the body of the plug.

The stay material is led from the roll over and under drag pins 284 secured in an upstanding bracket on the side of a moistening reservoir 287. The strip then passes over a guide roller 285, also mounted upon said extension of the reservoir, and thence over a moistening roll 286, which is journaled in the top of the reservoir and dips into the body of water, or other moistening fluid, contained therein. The moistening roll has a groove in the middle of its periphery where it contacts with the stay material, so as to leave a narrow strip of unmoistened glue for the upper feed roll 272 to engage without sticking. From the moistening roll 286, the stay material passes over an idle roll 288, which is mounted upon a pintle 289, which is adjustable longitudinally of the slot 280' in the bracket 280, the adjustability of said roll 288 permitting of variation of the time allowed for the glue to soften as the stay strip passes from the moistening roll to the die which applies the same to the corner of the box. From the roll 288, the strip passes horizontally through guide 290 on top of casting 260, thence between the feed rolls 267 and 272, and downward through the opening in the stationary knife 291, which latter is mounted on the forward end of the cover piece 233' and is held in position by pins 294 engaging slots 293 in opposite sides of said knife, as indicated in Figs. 17, 18 and 18ª. As indicated, the upper feed or pressure roll 272 is held down by a spring 271' and may be raised to permit the ready insertion of the stay strip by lifting the swinging frame 268. The lower knife 240', which is formed by the upper edge of the die 240, is held against the stationary knife 291 by a bushing 301 flattened on one side to prevent turning of the die, and a thumb nut 304 engaging a screw 302 mounted in the forward end of the stay slide 233, as more particularly illustrated in Fig. 17. The upper knife 291 is held down against the cutting edge of the die 240 by pressure bar 296 connected to the ends of pins 297, which are suspended in bushings 299 threaded in vertical openings in the forked members of the castings 260 in which the feed roll is journaled, said pins having sliding bushings 298 on their lower ends, between which and the upper bushings are located helical springs 300, which impose a yielding pressure on the bar 291 and permit the latter to rock and accommodate itself to any inequalities in the contacting surfaces of the two knives. This spring pressed bolt suspension of the knife 291 also provides means for compensating for the varying thickness of the knife due to grinding, the adjustment being made by setting up the bushing 299. The pressure bar 296 serves a threefold purpose of maintaining yielding pressure between the cutting knives, guiding the stay into the opening in the upper knife 291 when threading up, and as a stripper to prevent the stay following around under the feed roll 267 during the threading up operation, this last result being effected by two upwardly projecting lugs 296' on the pressure bar which project into the grooves of the feed roll 267, as indicated in Fig. 17.

It will be particularly noted that the frame 260 which carries the stay feed rolls and their accessories may be swung up and about the driving shaft 265 as a pivot, when the screws which hold this feed roller frame to the stay slide cover are removed, thereby greatly facilitating the cleaning, adjustment, repair and replacements of the parts, more especially the upper knife 291.

As hereinbefore indicated, the stay feed rollers on the respective sides of the machine, are operated from a common shaft 265 to which the gears 264 of the respective stay feed devices are splined. Rotary motion is imparted to these shafts 265 from the cross shaft 310 and intermittent rotary motion necessary to effect the feeding operation of just the proper and desired lengths of stay strips is imparted to shaft 310 by the mechanism particularly illustrated in Figs. 1 and 20 to 24, inclusive. The outer end of the shaft 310 is journaled in a bearing on the upper part of the main frame 1 of the machine. Secured to said shaft 310 is a member 320 of a roller clutch, the cooperating member of the clutch 319 including a casing portion 319' which encloses the cam 320 and confines the rollers 321. Secured to the opposite end of the clutch member 319 is a pinion 317 which is engaged by a rack on the end of connecting rod 316, the upper end of which is guided in a housing 318 loosely mounted on the shaft 310 and the clutch member 319. Said connecting rod 316 forms an extension of an eccentric 315, adjustably mounted on the end of the main drive shaft 2, as indicated in Fig. 1. The throw of this eccentric is adjusted to a direct reading scale by shifting the position of pin 315' in the slot in the hub of the eccentric, as shown in Fig. 23, and locking the pin in its adjusted position by a hand wheel of the type shown in Fig. 24. The upward stroke of the connecting rods 316 and the extent of rotation of shaft 310 will, therefore, be accurately determined by the adjustment of the eccentric 315 as indicated and, by this means, the exact length of the stays, which are fed at each operation, may be accurately regulated.

The roller clutch constituted by the members 319 and 320 with the interposed balls drives the shaft in the direction of the arrow in Fig. 21, as will be understood, which effects the feeding operation of the stay strips through the shafts 265 and the gearing associated therewith, as hereinbefore explained. The return stroke of the connecting rod 316 by cam 315 is ineffective, however, to rotate the shaft in the opposite direction, by reason of the interposed ball clutch, but in order to prevent shaft 310 from turning backward, due to friction between the parts and to a possible binding between the rollers 321 and the coacting clutch members, a similar clutch designed to drive in the reverse direction is provided at the outer end of the shaft 310, which clutch involves a casing member 325 which is fast to shaft 310 and an enclosed cam member 326 which is fixed to the bracket in which said shaft 310 is journaled, and between the interior of the casing and the cam member 326 are interposed spring pressed balls, the operation of the ball clutch thus constituted being to permit free rotation of the shaft 310 to effect the working operation of the stay feeds and to lock the shaft against rotation in the opposite direction. The casing member 325 of the clutch is provided with a hand wheel 327 which affords means for manually rotating the shaft 310 in a positive or feeding direction, regardless of whether the machine is in operation or not. This particular feature is especially useful in operating the shaft 310 to drive the stay feed mechanism in threading the stay material into the feeders.

*Setting and adjusting means.*

As hereinbefore indicated, the machine is particularly organized to adapt the adjustment of the parts which operate upon the blank after the latter leaves the feed rolls at the discharge end of the magazine table to operate upon blanks of varying lengths and widths to form boxes of varying sizes. This adjustment involves the shifting of the elements of the breaker device transversely of the machine for blanks of varying widths and means for shifting the stay pressure heads and their concomitant elements including the stay feed mechanisms, both transversely and longitudinally of the center line of the machine. In other words, all of the work performing elements that act directly upon the blanks must be susceptible of adjustment to operate upon different size blanks without changing the driving or operating connections of these elements, the latter involving the breaker or folder elements, the locator elements, the stay pressure heads, folder posts and stay feed mechanism. This result is effected by mounting these elements primarily upon the longitudinal girders 70, 70 disposed on opposite sides of the machine and supported by the shafts 72 and 73 which are journaled in the main frame 1 of the machine, as more particularly illustrated in Fig. 1. The castings 210, 210, which carry the stay pressure heads and the stay feeds, are slidably mounted on the tops of these girders and are also supported by the splined shafts 213, 213 on opposite sides of the machine, which shafts, in turn, are supported by the brackets 80 which constitute upward extensions of the respective girders 70, 70. In order to adjust the breaker elements, the locator elements, stay pressure heads and the stay feeds transversely of the machine, the girders 70, 70 are moved toward and from each other, such movement being effected by half nuts 70', which are formed or located within the hub sections 71' of the girders which embrace the supporting shafts 72 and 73, the latter having screw threads on the surfaces thereof to cooperate with the threads on the half nuts 70', so that, when said shafts 72 and 73 are rotated, the girders 70, 70 will be adjusted toward or from the central axis of the machine simultaneously. The means for operating the shafts 72 and 73 comprises a shaft 334, journaled in brackets on one side of the main frame and provided with spiral gears 335 and 336, which mesh with cooperating spiral gears 331 and 332 on said shafts 72 and 73, respectively, said shaft 334 being rotated in an appropriate direction by means of a crank 337 which is detachably engaged therewith, as indicated in Fig. 1.

In order to adjust the stay pressure heads and the stay feed mechanism carried thereby longitudinally of the main axis of the machine, so as to accommodate blanks of different lengths, the following mechanism is provided. Journaled in the bracket which carries the shaft 73, is a second transverse shaft 340 which is held against longitudinal movement by suitable collars on each side of the journal bearing, said shaft also being journaled in bearings formed on the upper side of the girders 70, 70 and having splined thereon two spiral gears 341, 341 which mesh with corresponding spiral gears 343 fixed to shafts 220 journaled in bearings on the respective ends of the girders 70, 70, said shafts running longitudinally of the girders and being provided with screw threads of opposite pitches, as indicated at 220' on Fig. 4, which screw threads are engaged by nuts 221, which are swiveled to the under side of the castings 210 to compensate for any slight misalignment, as each nut will swing about its stem connection with the plate 210 and align itself with the threads on the shaft 220. Cross shaft 340 is operated by the same crank which is used in connection with shaft 334 and, when said shaft 340 is rotated, it will impart rotatory motion to both of the shafts 220 supported by the girders 70, 70 and the rotation of these two shafts will cause the pairs of plates 210 on the respective sides of the machine and all of the apparatus carried thereby, including the stay pressure heads and the stay feeding mechanism, to be moved toward and from each other and simultaneously to effect the desired adjustment to accommodate blanks of different lengths. It will be understood, of course, that the pairs of plates on the respective sides of the machine are simultaneously adjusted in either direction by rotating shaft 340 in one direction or the other.

From the foregoing description of the machine and the operation of its several parts, the successive sequential operations on the blanks, which are fed one at a time from the magazine feed table to the feed rolls, are through the breaker or folder device from which the blank is passed by the pusher or transfer element to the locator which properly positions the blank under the form, which latter descends to cause the side and end flanges of the box blank to be bent upward as the blank is forced downward against and between the folder posts, during which series of operations the stay material is being fed forward from the reels by the stay feeds to a position in front of the dies on the stay pressure heads, which latter are then operated to sever the four stay strips and press the latter against the corners of the box and, after the stays have been thus applied, the form is withdrawn and the sequence of operations is repeated, the succeeding blank following immediately and, when properly stayed, displacing the preceding blank and delivering the same to a discharge belt 360, which operates over an idle roller 361 at the rear of the machine.

In order to clearly indicate the order and sequence of operations as the blanks pass through the machine, the several diagrams, as shown in Figs. 25 to 29, respectively, have been provided. In the diagrams aforesaid, the absence of arrows indicates that the parts are dwelling. Referring to the several diagrams, Fig. 25 indicates blank "A" being pushed forward into the box forming position with the stays feeding, Fig. 26 shows "A" blank in position to receive the form, the stays at this time having been fed to stay applying position and a second blank "B" being delivered from the magazine feed table to the feed rolls, and Fig. 27 illustrates "A" blank as completely formed and the stays cut and applied with the "B" blank moved into position in the breaker to have the side flanges folded or broken. At this time, the feed table is returning to initial position to feed the succeeding blank. In Fig. 28, "B" blank is being folded in the breaker and the pusher pawl is returning to position for engagement with the "B" blank. "A" blank having been completed remains between the stay pressure heads until the next or "B" blank reaches the forming and stay applying position, the "A" blank being retained in this position by the spring clips 244 on posts 242.

In Fig. 29, the feed table has been completely returned to starting position, "B" blank has been broken or folded and the pusher pawl has been retracted to position for engaging said "B" blank to advance the same through the locator and into position under the form.

What I claim is:

1. A box staying machine comprising a blank feeder, a breaker for bending the side flanges, a locator to reverse the bend of said blanks in part, a pusher to advance the blanks from the breaker to the locator, a former receiving the blanks from the locator, stay applying means cooperating with the former, disposed for operation in the order named, a main driving element, individual actuating means driven thereby for effecting the non-working strokes of the feeder, pusher, former and stay applying devices, and springs for effecting the working strokes of said devices.

2. A box staying machine comprising a blank feeder, a breaker for bending the side flanges, a locator to reverse the bend of said blanks in part, a pusher to advance the blanks from the breaker to the locator, a former receiving the blanks from the locator, stay applying means cooperating with the former, disposed for operation in the order named, a main driving element, individual cam operated actuating means driven thereby for effecting the non-working strokes of the feeder, pusher, former and stay applying devices, and springs for effecting the working strokes of said devices.

3. A box staying machine comprising a reciprocating feed table, feed rolls adjacent the discharge end of said table, breaker devices disposed parallel with and laterally adjustable with respect to the longitudinal axis of the machine to receive the blanks from the feed rolls and fold the side flanges of the blank to an acute angle with the plane of the blank, and means for simultaneously operating said breaker devices.

4. A box staying machine comprising a reciprocating feed table, feed rolls adjacent the discharge end of said table, breaker devices disposed parallel with and laterally adjustable with respect to the longitudinal axis of the machine, each breaker device comprising a folder plate to support the side flanges of the blank and a shoe having an edge cooperating with the inner edge of the folder plate, and means for effecting relative vertical and lateral movements between the folder plates and the shoes, whereby the side flanges of the blank are folded over the edges of the shoes to an acute angle with the plane of the blank.

5. A box staying machine comprising a reciprocating feed table, feed rolls adjacent the discharge end of said table, breaker devices disposed parallel with and laterally adjustable with respect to the longitudinal axis of the machine, each breaker device including a laterally rocking folder plate and a stationary shoe adjacent the inner edge of said plate, and means for oscillating the folder plates across and parallel with the adjacent edges of the shoes to fold the side flanges of the blank over the shoes to an acute angle with the plane of the blank.

6. A box staying machine comprising a reciprocating feed table, feed rolls adjacent the discharge end of said table, breaker devices disposed parallel with and laterally adjustable with respect to the longitudinal axis of the machine, each breaker device including a rock shaft mounted longitudinally of the machine, eccentrics on said shaft, brackets journaled on said eccentrics, a folder plate secured to said brackets, shoe brackets overhanging the folder plate, a downwardly and outwardly inclined shoe fixed to said shoe brackets with its outer edge adjacent the inner edge of said folder plate, and means for simultaneously operating the rock shafts of said breaker devices.

7. A box staying machine comprising a reciprocating feed table, feed rolls adjacent the discharge end of said table, breaker devices disposed parallel with and laterally adjustable with respect to the longitudinal axis of the machine, each breaker device including a rock shaft mounted longitudinally of the machine, eccentrics on said shaft, brackets journaled on said eccentrics and having laterally slotted guides, blocks pivoted to slide in said guides, a folder plate secured to said brackets, shoe brackets overhanging the folder plate, a downwardly and outwardly inclined shoe fixed to said shoe brackets with its outer edge adjacent the inner edge of said folder plate, and means for simultaneously operating the rock shafts of said breaker devices.

8. A box staying machine comprising a reciprocating feed table, feed rolls adjacent the discharge end of said table, breaker devices disposed parallel with and laterally adjustable with respect to the longitudinal axis of the machine, each breaker device including a rock shaft mounted longitudinally of the machine, eccentrics on said shaft, brackets journaled on said eccentrics and having laterally slotted guides, blocks pivoted to slide in said guides, a folder plate secured to said brackets, shoe brackets overhanging the folder plate, a downwardly and outwardly inclined shoe fixed to said shoe brackets with its outer edge adjacent the inner edge of said folder plate, a side guide mounted for lateral adjustment relatively to the folder plate and carried by the folder plate brackets, and means for simultaneously operating the rock shafts of said breaker devices.

9. A box staying machine comprising a reciprocating feed table, feed rolls adjacent the discharge end of said table, breaker devices disposed parallel with and laterally adjustable with respect to the longitudinal axis of the machine, each breaker device including a rock shaft mounted longitudinally of the machine, eccentrics on said shaft, brackets journaled on said eccentrics, a folder plate secured to said brackets, shoe brackets overhanging the folder plate, a downwardly and outwardly inclined shoe fixed to said shoe brackets with its outer edge adjacent the inner edge of said folder plate, a transverse shaft having sliding gear connections with said rock shafts, means connected with the prime mover of the machine for operating said transverse shaft in one direction, and a spring for operating said shaft in the opposite direction to effect the working stroke of the breaker devices.

10. A box staying machine comprising a reciprocating feed table, feed rolls adjacent the discharge end of said table, breaker devices disposed parallel with and laterally adjustable with respect to the longitudinal axis of the machine to receive the blanks from the feed rolls and fold the side flanges of the blank to an acute angle with the plane of the blank, means for simultaneously operating said breaker devices, locator devices comprising pairs of substantially parallel inclined plates having pointed ends adjacent the breaker devices to receive the side flanges of the blank and bend the same outwardly, and a reciprocating pusher engaging the blank and advancing the same from the breaker into the locator.

11. A box staying machine comprising a reciprocating feed table, feed rolls adjacent the discharge end of said table, breaker devices disposed parallel with and laterally adjustable with respect to the longitudinal axis of the machine to receive the blanks from the feed rolls and fold the side flanges of the blank to an acute angle with the plane of the blank, means for simultaneously operating said breaker devices, locator devices comprising pairs of substantially parallel inclined plates having pointed ends adjacent the breaker devices to receive the side flanges of the blank and bend the same outwardly, one plate of each pair having a spring actuated section to force the blank flanges against the opposite plate and thereby brake the movement of the blank, and a reciprocating pusher engaging the blank and advancing the same from the breaker into the locator.

12. A box staying machine comprising a reciprocating feed table, feed rolls adjacent the discharge end of said table, breaker devices disposed parallel with and laterally adjustable with respect to the longitudinal axis of the machine to receive the blanks from the feed rolls and fold the side flanges of the blank to an acute angle with the plane of the blank, means for simultaneously operating said breaker devices, locator devices comprising pairs of substantially parallel inclined plates having pointed ends adjacent the breaker devices to receive the side flanges of the blank and bend the same outwardly, one plate of each pair having a spring actuated section to force the blank flanges against the opposite plate and thereby brake the movement of the blank, a reciprocating pusher engaging the blank and advancing the same from the breaker into the locator, and a longitudinally adjustable stop adjacent the rear end of the locator to arrest the blank.

13. A box staying machine comprising a reciprocating feed table, feed rolls adjacent the discharge end of said table, breaker devices disposed parallel with and laterally adjustable with respect to the longitudinal axis of the machine to receive the blanks from the feed rolls and fold the side flanges of the blank to an acute angle with the plane of the blank, means for simultaneously operating said breaker devices, locator devices comprising pairs of substantially parallel inclined plates having pointed ends adjacent the breaker devices to receive the side flanges of the blank and bend the same outwardly, a reciprocating pusher engaging the blank and advancing the same from the breaker into the locator, a vertically reciprocating form disposed between the locator elements to force the blank downwardly out of the locator, stay pressure heads having folder posts to bend the blank flanges into engagement with the form, stay feeders carried by the pressure heads to deliver the stays between the die elements of the pressure heads and the corners of the box, and means for operating the die elements of the heads to cut and clamp the stays to the box corners.

14. In a box staying machine the combination of a breaker device for bending the side flanges of the blank to an acute angle with the plane of the blank, a locator to reverse the bend of said blanks in part, a pusher to advance the blank from the breaker into the locator, stay pressure heads having flange folding posts positioned below the locator, a vertically reciprocating form to transfer the blank to a position between the folder posts and pressure heads, and stay feeding devices located on the pressure heads for delivering predetermined lengths of stay material to the heads.

15. In a box staying machine a breaker device comprising a pair of folder plates, and a pair of shoes cooperating therewith to fold the side flanges of the blank to an acute angle with the plane of the blank, and inclined stops mounted on the respective folder plates to engage and raise the forward corners of the blanks.

16. In a box staying machine a breaker device comprising a pair of folder plates, and a pair of shoes cooperating therewith to fold the side flanges of the blank to an acute angle with the plane of the blank, laterally adjustable side guides cooperating with said folder plates, and stops having inclined faces overlying the folder plates and adjustable longitudinally of said side guides, said stops serving to raise the forward corners of the blanks.

17. In a box staying machine the combination of blank feeding means, breaker mechanism to bend the side flanges of the blank to an acute angle with the plane of the blank, a locator to receive the blank from the breaker to reverse the bends of said blank in part and position the blank under the form, and a pusher to advance the blank from the breaker into the locator, said pusher including a slide mounted for reciprocation longitudinally of the machine, a spring actuated pawl on the rear end of said slide, a band connected to said slide, a wheel to which said band is connected, positive connections between said wheel and the prime mover to retract the pusher, and spring means to effect the working stroke of the pusher.

18. In a box staying machine the combination of blank feeding means, breaker mechanism to bend the side flanges of the blank to an acute angle with the plane of the blank, a locator to receive the blank from the breaker to reverse the bends of said blank in part and position the blank under the form, a pusher to advance the blank from the breaker into the locator, a form disposed between the locator elements, means for reciprocating the form vertically including positive connections between the form and the prime mover for retracting said form and spring means for advancing the form, and stay applying means cooperating with said form.

19. In a box staying machine the combination of blank feeding means, breaker mechanism to bend the side flanges of the blank to an acute angle with the plane of the blank, a locator to receive the blank from the breaker to reverse the bends of said blank in part and position the blank under the form block, a pusher to advance the blank from the breaker into the locator, a form block disposed between the locator elements, means for adjusting the form block vertically, means for reciprocating the form block vertically including positive connections between the form block and the prime mover for retracting said form block and spring means for advancing the form block, and stay applying means cooperating with said form block.

20. In a box staying machine the combination of blank feeding means, breaker mechanism to bend the side flanges of the blank to an acute angle with the plane of the blank, a locator to receive the blank from the breaker to reverse the bend of said blank in part and position the blank under the form, a pusher to advance the blank from the breaker into the locator, an arch bracket spanning the main frame above the locator, a sleeve vertically reciprocable in said bracket, a spindle adjustably mounted in said sleeve, a block secured to the lower end of said spindle, means connecting the sleeve with the prime mover for elevating the block, spring means for lowering the block to operative position, and stay applying means cooperating with said block.

21. In a box staying machine the combination of blank feeding means, breaker mechanism to bend the side flanges of the blank to an acute angle with the plane of the blank, a locator to receive the blank from the breaker to reverse the bend of said blank in part and position the blank under the form, a pusher to advance the blank from the breaker into the locator, an arch bracket spanning the main frame above the locator, a sleeve vertically reciprocable in said bracket, a spindle adjustably mounted in said sleeve, a block secured to the lower end of said spindle, a rack on said sleeve, a jack shaft journaled in said arch bracket, a gear on said shaft engaging said rack, a gear on the end of said shaft, a rack bar engaging the latter gear, a pinion journaled on the main frame meshing with said rack bar, a cam on the main shaft, a yoked connecting rod cooperating with said cam, a rack on the end of said connecting rod engaging said pinion, a helical spring fast to said jack shaft and to the arch bracket to effect the working stroke of the form block, and stay applying means cooperating with said form block.

22. In a box staying machine the combination of blank feeding means, breaker mechanism to bend the side flanges of the blank to an acute angle with the plane of the blank, a locator to receive the blank from the breaker to reverse the bends of said blank in part and position the blank under the form, a pusher to advance the blank from the breaker into the locator, an arch bracket spanning the main frame above the locator, a sleeve vertically reciprocable in said bracket, a spindle adjustably mounted in said sleeve, a block secured to the lower end of said spindle, a rack on said sleeve, a jack shaft journaled in said arch bracket, a gear on said shaft engaging said rack, a gear on the end of said shaft, a rack bar engaging the latter gear, a pinion journaled on the main frame meshing with said rack bar, a cam on the main shaft, a yoked connecting rod cooperating with said cam, a rack on the end of said connecting rod engaging said pinion, a helical spring fast to said jack shaft and to the arch bracket to effect the working stroke of the form block, a latch for holding said first rack bar and its connected elements in retracted relation, and stay applying means cooperating with said form block.

23. In a box staying machine the combination of blank feeding means, breaker mechanism to bend the side flanges of the blank to an acute angle with the plane of the blank, a locator to receive the blank from the breaker to reverse the bends of said blank in part and position the blank under the form, a pusher to advance the blank from the breaker into the locator, a form disposed between the locator elements, means for reciprocating the form vertically, stay applying devices cooperating with said form and disposed in quadrilateral arrangement about the vertical axis of the form, each of said devices comprising a plate mounted for longitudinal and transverse adjustment relative to the center line of the machine, a pressure slide reciprocably mounted on said plate and having an anvil on its forward end to engage the corner of a folded blank, a cam for operating said slide, side and end flange bending posts carried by said plate, a stay feeder mounted on said plate comprising a holder for a roll of stay material, guide and moistening rolls over which the stay material is fed, feed rolls journaled above the outer end of the pressure slide, a stationary knife adjacent the upper end of the anvil of said slide, and means for intermittently operating the feed rolls of each feeder.

24. In a box staying machine, a stay feeding device including feed rolls journaled thereon, a shaft extending longitudinally of the machine for driving the feed rolls, a cross shaft geared to the first shaft, means connected to the main power shaft of the machine for driving the cross shaft to feed the stay, said means including a ratchet clutch effective to rotate the shaft for the feeding operation, a second ratchet clutch to prevent reverse movement of the shaft comprising one member fast to said shaft and the second member fixed to the machine frame, and a hand wheel on the first clutch member to rotate the shaft in a feeding direction.

25. In a box staying machine in combination with a magazine feed table and feed rolls supported at the front end of the main frame, longitudinal girders supported at their ends by cross shafts journaled on the main frame, means for adjusting said girders toward and from each other transversely of the machine, breaker devices, locator devices, stay pressure heads including folder posts, pressure slides and stay feeding and cutting mechanisms carried by the respective girders, a pusher bar reciprocable between the breaker and the locator, a vertically reciprocating form in alignment with the locator and the pressure heads, positive connections between the feed table, the breaker, the pusher, the form and the stay slides, respectively, and the prime mover of the machine for effecting the non-operating movements of the several devices, spring means for effecting the working strokes of said devices, and adjustable connections between the prime mover and the several stay feeders for operating the latter to feed the stays to the pressure heads.

26. In a box staying machine the combination with a breaker for bending the side flanges of the blank to an acute angle with the plane of the blank, a locator to position the blank centrally with respect to the form and stay applying devices, and means for advancing the blank from the breaker to the locator comprising a slide having a spring elevated pawl at its rear end, a fixed guide rail on which said slide is supported, a flexible band to which said slide is attached, an idler pulley over which said band passes, a wheel adjustably fixed to a shaft journaled in the machine frame, said band engaging and being attached to the periphery of said wheel, direct connections between said shaft and the prime mover to rotate the shaft and the wheel in one direction to retract the pusher slide, and a helical spring surrounding said shaft and fixed to the latter and to the machine frame to effect the working stroke of said pusher.

27. In a box staying machine, stay feeding and applying devices mounted for symmetrical adjustment longitudinally and laterally of the center line of the machine, longitudinal girders adjustable transversely of the machine each supporting a pair of said stay feeding and applying devices, a pair of longitudinal shafts mounted on each girder, cross shafts journaled in the main frame for driving the two sets of longitudinal shafts, each stay feeding and applying device including a plate having a screw and nut connection with one of said longitudinal shafts, a cam journaled on said plate and having a splined connection with the other longitudinal shaft, guides on said plates, a pressure slide engaging said guides and having a box corner engaging anvil mounted on its front end and a roller on its rear engaging said cam, side and end flange folding posts mounted on the forward end of said guides adjacent said anvil, a cover secured to said plate above the slide, a frame removably secured to said cover, a main stay feed roll journaled in said frame, meshing beveled gears mounted on said frame to drive the feed roll, a yoke pivoted to the frame carrying an upper feed roll, gearing connecting said feed rolls, an upper knife having an adjustable spring suspension on said frame and lying below the main feed roll, a stay roll magazine on said cover, moistening and guiding means between the magazine and the feed rolls, and means for simultaneously operating the several feed rolls said means comprising longitudinal shafts journaled in brackets on said girders, each longitudinal shaft having a splined connection with one of the feed roll driving gears, a cross shaft journaled in the main frame, beveled gear connections between said cross shaft and the two longitudinal shafts, and adjustable connections between said cross shaft and the prime mover to regulate the extent of movement of said cross shaft and the length of the stay material fed at each operation.

28. In a box staying machine the combination of a stay pressure head including a slide having a stay applying anvil on its outer end, and a stay feed device carried by said head, said stay feed device including a forked frame removably secured to said head, journal bearings in the arms of the fork, a journal bearing disposed laterally of the fork, a shaft carrying a feed roll mounted in the fork journal bearings, a beveled gear on the outer end of said shaft, a beveled gear mounted in the lateral journal bearing and meshing with the first beveled gear, and a drive shaft traversing the lateral journal bearing and having a splined connection with the second beveled gear; whereby the frame and its accessories may be swung laterally about the drive shaft.

29. In a box staying machine the combination of a stay pressure head including a slide having a stay applying anvil on its outer end, and a stay feed device carried by said head, said stay feed device including a forked frame removably secured to said head, journal bearings in the arms of the fork, a journal bearing disposed laterally of the fork, a shaft carrying a feed roll mounted in the fork journal bearings, a gear on the outer end of said shaft, means for intermittently driving said gear and feed roll, an upper knife cooperating with the upper edge of the anvil to cut the stay, and adjustable spring suspension means connecting the knife with the forward ends of the fork to hold said knife in yielding engagement with the top of the anvil.

30. In a box staying machine the combination of a stay pressure head including a slide having a vertically adjustable stay applying anvil on its outer end, and a stay feed device carried by said head, said stay feed device including a forked frame removably secured to said head, journal bearings in the arms of the fork, a journal bearing disposed laterally of the fork, a shaft carrying a feed roll mounted in the fork journal bearings, a gear on the outer end of said shaft, means for intermittently driving said gear and feed roll, an upper knife cooperating with the upper edge of the anvil to cut the stay, and adjustable spring suspension means connecting the knife with the forward ends of the fork to hold said knife in yielding engagement with the top of the anvil.

31. A box staying machine comprising blank feeding means, breaker devices disposed parallel with and laterally adjustable with respect to the longitudinal axis of the machine to receive the blanks from the feed rolls and fold the side flanges of the blank to an acute angle with the plane of the blank, and means for simultaneously operating said breaker devices.

32. A box staying machine comprising blank feeding means, breaker devices disposed parallel with and laterally adjustable with respect to the longitudinal axis of the machine, each breaker device comprising a folder plate to support the side flanges of the blank and a shoe having an edge cooperating with the inner edge of the folder plate, and means for effecting relative vertical and lateral movements between the folder plates and the shoes, whereby the side flanges of the blank are folded over the edges of the shoes to an acute angle with the plane of the blank.

33. A box staying machine comprising blank feeding means, breaker devices disposed parallel with and laterally adjustable with respect to the longitudinal axis of the machine, each breaker device including a laterally rocking folder plate and a stationary shoe adjacent the inner edge of said plate, and means for oscillating the folder plates across and parallel with the adjacent edges of the shoes to fold the side flanges of the blank over the shoes to an acute angle with the plane of the blank.

34. A box staying machine comprising blank feeding means, breaker devices disposed parallel with and laterally adjustable with respect to the longitudinal axis of the machine, each breaker device including a rock shaft mounted longitudinally of the machine, eccentrics on said shaft, brackets journaled on said eccentrics, a folder plate secured to said brackets, shoe brackets overhanging the folder plate, a downwardly and outwardly inclined shoe fixed to said shoe brackets with its outer edge adjacent the inner edge of said folder plate, and means for simultaneously operating the rock shafts of said breaker devices.

35. A box staying machine comprising blank feeding means, breaker devices disposed parallel with and laterally adjustable with respect to the longitudinal axis of the machine, each breaker device including a rock shaft mounted longitudinally of the machine, eccentrics on said shaft, brackets journaled on said eccentrics and having laterally slotted guides, blocks pivoted to slide in said guides, a folder plate secured to said brackets, shoe brackets overhanging the folder plate, a downwardly and outwardly inclined shoe fixed to said shoe brackets with its outer edge adjacent the inner edge of said folder plate, and means for simultaneously operating the rock shafts of said breaker devices.

36. A box staying machine comprising blank feeding means, breaker devices disposed parallel with and laterally adjustable with respect to the longitudinal axis of the machine, each breaker device including a rock shaft mounted longitudinally of the machine, eccentrics on said shaft, brackets journaled on said eccentrics and having laterally slotted guides, blocks pivoted to slide in said guide, a folder plate secured to said brackets, shoe brackets overhanging the folder plate, a downwardly and outwardly inclined shoe fixed to said shoe brackets with its outer edge adjacent the inner edge of said folder plate, a side guide mounted for lateral adjustment relatively to the folder plate and carried by the folder plate brackets, and means for simultaneously operating the rock shafts of said breaker devices.

37. A box staying machine comprising blank feeding means, breaker devices disposed parallel with and laterally adjustable with respect to the longitudinal axis of the machine, each breaker device including a rock shaft mounted longitudinally of the machine, eccentrics on said shaft, brackets journaled on said eccentrics, a folder plate secured to said brackets, shoe brackets overhanging the folder plate, a downwardly and outwardly inclined shoe fixed to said shoe brackets with its outer edge adjacent the inner edge of said folder plate, a transverse shaft having sliding gear connections with said rock shafts, means connected with the prime mover of the machine for operating said transverse shaft in one direction, and a spring for operating said shaft in the opposite direction to effect the working stroke of the breaker devices.

38. A box staying machine comprising blank feeding means, breaker devices disposed parallel with and laterally adjustable with respect to the longitudinal axis of the machine to receive the blanks from the feed rolls and fold the side flanges of the blank to an acute angle with the plane of the blank, means for simultaneously operating said breaker devices, locator devices comprising pairs of substantially parallel inclined plates having pointed ends adjacent the breaker devices to receive the side flanges of the blank and bend the same outwardly, and a reciprocating pusher engaging the blank and advancing the same from the breaker into the locator.

In testimony whereof I affix my signature.

FRANK G. FEELEY.